(12) United States Patent
Kim

(10) Patent No.: US 12,253,953 B2
(45) Date of Patent: Mar. 18, 2025

(54) STORAGE DEVICE AND OPERATING METHOD THEREOF

(71) Applicant: SAMSUNG ELECTRONICS CO., LTD., Suwon-si (KR)

(72) Inventor: Minho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/373,680

(22) Filed: Sep. 27, 2023

(65) Prior Publication Data
US 2024/0264947 A1 Aug. 8, 2024

(30) Foreign Application Priority Data

Feb. 3, 2023 (KR) .......................... 10-2023-0014903

(51) Int. Cl.
*G06F 12/10* (2016.01)
(52) U.S. Cl.
CPC .................................... *G06F 12/10* (2013.01)
(58) Field of Classification Search
None
See application file for complete search history.

(56) References Cited

U.S. PATENT DOCUMENTS

| | | | |
|---|---|---|---|
| 6,591,328 B1 * | 7/2003 | Iida ...................... | G11B 27/105 711/202 |
| 9,153,287 B1 | 10/2015 | Hamilton et al. | |
| 9,268,706 B2 | 2/2016 | Kunimatsu et al. | |
| 10,776,007 B2 | 9/2020 | Kunimatsu et al. | |
| 10,970,228 B2 | 4/2021 | Hanna et al. | |
| 11,263,168 B2 | 3/2022 | Liao et al. | |
| 11,657,860 B2 | 5/2023 | Kim et al. | |
| 2001/0055227 A1 * | 12/2001 | Takata ..................... | G11C 7/24 365/199 |

(Continued)

FOREIGN PATENT DOCUMENTS

| CN | 115220661 A | 10/2022 |
|---|---|---|
| KR | 10-1191650 B1 | 10/2012 |

OTHER PUBLICATIONS

Shim et al., "GP3D: 3D NAND Based In-Memory Graph Processing Accelerator", IEEE Journal on Emerging and Selected Topics in Circuits and Systems, Jun. 13. 2022, 8 total pages, vol. 12, No. 2.

*Primary Examiner* — Brian R Peugh
(74) *Attorney, Agent, or Firm* — Sughrue Mion, PLLC

(57) ABSTRACT

A storage device is provided. The storage device includes: a first non-volatile memory including a plurality of cell strings storing a plurality of logical address values and a plurality of physical address values; a second non-volatile memory including a plurality of memory cells corresponding to the plurality of physical address values; and a storage controller configured to read a first physical address value from the first non-volatile memory based on a first logical address value, and control a read operation on the second non-volatile memory based on the first physical address value. A first cell string among the plurality of cell strings includes: a plurality of first memory cells storing the first logical address value and respectively connected to word lines in a first group; and at least one second memory cell storing the first physical address value and connected to at least one word line in a second group.

20 Claims, 32 Drawing Sheets

(56) References Cited

U.S. PATENT DOCUMENTS

2017/0177497 A1 6/2017 Chun et al.
2017/0206030 A1 7/2017 Woo et al.
2023/0162766 A1 5/2023 Jo et al.

* cited by examiner

FIG. 2

| LOGICAL ADDRESS | PHYSICAL ADDRESS | |
|---|---|---|
| L1 | P1 | — MAP1 |
| L2 | P2 | — MAP2 |
| L3 | P3 | — MAP3 |
| L4 | P4 | — MAP4 |
| ... | ... | |

| ADDRESS VALUE (IN DECIMAL) | ADDRESS VALUE (IN BINARY) | DATA |
|---|---|---|
| 0 | 0 0 | 0 1 0 1 |
| 2 | 1 0 | 1 0 0 1 |
| 1 | 0 1 | 0 1 1 0 |
| 3 | 1 1 | 1 0 1 0 |

FIG. 7C

| SEARCH | LAV | CURRENT FLOW |
|--------|-----|--------------|
| 1 | 1 | O |
| 1 | 0 | X |
| 1 | N | X |
| 0 | 1 | X |
| 0 | 0 | O |
| 0 | N | X |
| P | 1 | O |
| P | 0 | O |
| P | N | O |

STORAGE DEVICE AND OPERATING METHOD THEREOF

CROSS-REFERENCE TO RELATED APPLICATION

This application claims priority to Korean Patent Application No. 10-2023-0014903, filed on Feb. 3, 2023, in the Korean Intellectual Property Office, the disclosure of which is incorporated by reference herein in its entirety.

BACKGROUND

The present disclosure relates to a memory device, and more particularly, to a storage device, an operating method thereof, a non-volatile memory device, and an operating method of the non-volatile memory device.

To exchange data with a host, a storage device manages mapping data, which maps a logical address of the host to a physical address of non-volatile memory, and stores the mapping data in the non-volatile memory. To increase an operating speed, the storage device loads part of the mapping data, which is stored in the non-volatile memory, to a working memory and retrieves a physical address mapped to a logical address by referring to the mapping data. When mapping data exceeds capacity of working memory, a miss of not retrieving desired mapping data may occur due to a portion of the mapping data not being loaded to the working memory. In this case, the number of read operations of the non-volatile memory increases to retrieve the desired mapping data, and accordingly, the operating speed of storage devices may decrease.

SUMMARY

The present disclosure provides a storage device for increasing operating speed and efficiency by retrieving a physical address corresponding to a logical address from non-volatile memory and an operating method of the storage device.

The present disclosure also provides a non-volatile memory device capable of searching for a physical address corresponding to a logical address and an operating method of the non-volatile memory device.

According to an aspect of an example embodiment, a storage device includes: a first non-volatile memory includes a plurality of cell strings storing a plurality of logical address values and a plurality of physical address values; a second non-volatile memory including a plurality of memory cells corresponding to the plurality of physical address values; and a storage controller configured to read a first physical address value from the first non-volatile memory based on a first logical address value, and control a read operation on the second non-volatile memory based on the first physical address value. A first cell string among the plurality of cell strings includes: a plurality of first memory cells storing the first logical address value and respectively connected to word lines in a first group; and at least one second memory cell storing the first physical address value and connected to at least one word line in a second group.

According to another aspect of an example embodiment, storage device includes: a first non-volatile memory including a plurality of cell strings storing a plurality of logical address values and a plurality of physical address values; a second non-volatile memory including a plurality of memory cells corresponding to the plurality of physical address values; and a storage controller configured to read a first logical address value from the first non-volatile memory based on a first physical address value, and control a read operation on the second non-volatile memory based on the first physical address value. A first cell string among the plurality of cell strings includes: a plurality of first memory cells storing the first physical address value and respectively connected to word lines in a first group; and at least one second memory cell storing the first logical address value and connected to at least one word line in a second group.

According to still another aspect of an example embodiment, a non-volatile memory device includes: a control logic circuit configured to generate data by encoding a first logical address value received from a controller; a row decoder configured to respectively apply, to word lines in a first group, word line voltages corresponding to the first logical address value; and a memory cell array including a plurality of cell strings storing a plurality of logical address values and a plurality of physical address values. A first cell string among the plurality of cell strings includes: a plurality of first memory cells storing the first logical address value and respectively connected to the word lines in the first group; and at least one second memory cell storing a first physical address value mapped to the first logical address value and connected to at least one word line in a second group. The first physical address value is read by a read operation performed on the at least one second memory cell while current flows in the first cell string due to the word line voltages.

According to yet another aspect of an example embodiment, operating method of a storage device including a storage controller, a first non-volatile memory, and a second non-volatile memory, includes: transmitting, by the storage controller, a logical address to the first non-volatile memory according to a read request indicating the logical address; performing, by the first non-volatile memory, a read operation of a physical address corresponding to the logical address; transmitting, by the first non-volatile memory, the physical address to the storage controller, the first non-volatile memory including a plurality of cell strings storing a plurality of logical addresses and a plurality of physical addresses; transmitting, by the storage controller, a read command indicating the physical address to the second non-volatile memory; and reading, by the second non-volatile memory, data from the physical address and transmitting, by the second non-volatile memory, the data to the storage controller. A first cell string among the plurality of cell strings includes: a plurality of first memory cells storing the logical address and respectively connected to word lines in a first group; and at least one second memory cell storing the physical address and connected to at least one word line in a second group.

According to a further aspect of an example embodiment, an operating method of a storage device including a storage controller, a buffer chip, a first non-volatile memory, and a plurality of second non-volatile memories, includes: transmitting, by the storage controller, a logical address to the buffer chip in response to a read request indicating the logical address; transmitting, by the buffer chip, the logical address to the first non-volatile memory; performing, by the first non-volatile memory, a read operation of a physical address corresponding to the logical address; transmitting, by the first non-volatile memory, the physical address to the buffer chip, the first non-volatile memory including a plurality of cell strings storing a plurality of logical addresses and a plurality of physical addresses; transmitting, by the buffer chip, a read command indicating the physical address to one of the plurality of second non-volatile memories;

reading, by the one of the plurality of second non-volatile memories, data based on the physical address; transmitting, by the one of the plurality of second non-volatile memories, the data to the buffer chip, the one of the plurality of second non-volatile memories receiving the read command; and transmitting, by the buffer chip, the data to the storage controller. A first cell string among the plurality of cell strings includes: a plurality of first memory cells storing the logical address and respectively connected to word lines in a first group; and at least one second memory cell storing the physical address and connected to at least one word line in a second group.

BRIEF DESCRIPTION OF DRAWINGS

The above and other aspects will be more clearly understood from the following description of embodiments, taken in conjunction with the accompanying drawings, in which:

FIG. 2 illustrates logical-to-physical (L2P) mapping data according to an embodiment;

FIG. 6 is a table showing address values and data corresponding to the address values, according to an embodiment;

FIG. 7C is a table showing a current flow according to data stored in a memory cell, according to an embodiment;

DETAILED DESCRIPTION

Figure 1A:
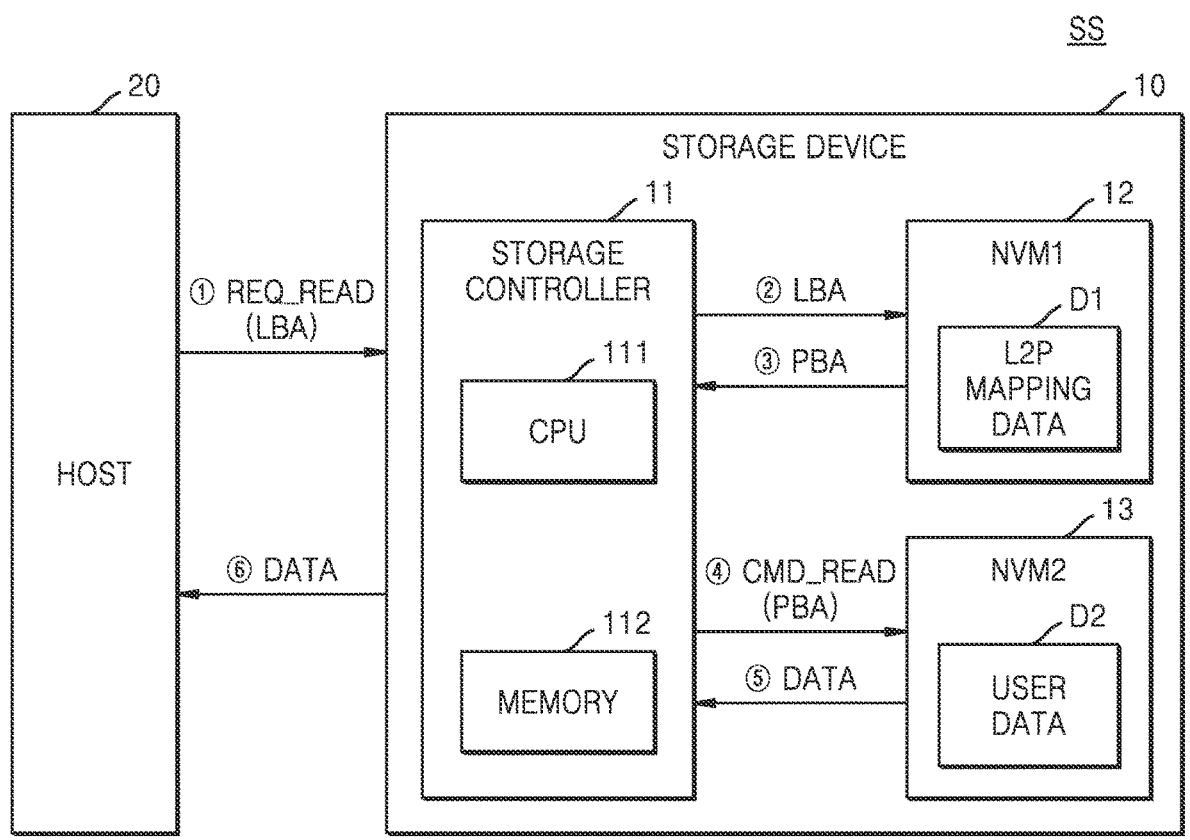
FIG. 1A is a block diagram of a storage system according to an embodiment.

Hereinafter, embodiments are described in detail with reference to the accompanying drawings. Like components are denoted by like reference numerals throughout the specification, and repeated descriptions thereof are omitted. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure.

FIG. 1A is a block diagram of a storage system SS according to an embodiment.

Referring to FIG. 1A, the storage system SS may include a storage device 10 and a host 20, and may thus be referred to as a host-storage system. The storage device 10 may include a storage controller 11, first non-volatile memory (or NVM1) 12, and second non-volatile memory (or NVM2) 13. According to an embodiment, the storage controller 11 may be referred to as a controller, a memory controller, or a non-volatile memory controller. According to an embodiment, the first non-volatile memory 12 and the second non-volatile memory 13 may be respectively referred to as a first storage region and a second storage region.

The storage controller 11 may include a central processing unit (CPU) 111 and a memory 112. The CPU 111 may generally control operations of the storage controller 11. For example, the CPU 111 may be implemented in a controller chip. In an embodiment, the CPU 111 may include a multi-core processor, for example, a dual-core processor or a quad-core processor. The memory 112 may be used as a buffer memory or a working memory. For example, the memory 112 may be implemented in a dynamic random access memory (DRAM) chip or a static RAM (SRAM) chip. In an embodiment, the CPU 111 and the memory 112 may be implemented by separate chips from each other. However, embodiments are not limited thereto. The CPU 111 and the memory 112 may be implemented by one chip.

The first non-volatile memory 12 may store mapping data between a logical address and a physical address, i.e., logical-to-physical (L2P) mapping data D1. The logical address may refer to an address received from the host 20, and the physical address may refer to an address actually used to store data in the second non-volatile memory 13. The second non-volatile memory 13 may store user data D2. The second non-volatile memory 13 may further store metadata.

FIG. 2 illustrates L2P mapping data according to an embodiment.

Referring to FIGS. 1A and 2, the first non-volatile memory 12 may store the L2P mapping data D1, which may include a plurality of pieces of mapping data, e.g., first to fourth mapping data MAP1 to MAP4. In an embodiment, each of the first to fourth mapping data MAP1 to MAP4 may be stored in a cell string (e.g., CS in FIG. 5).

The first mapping data MAP1 may include a first logical address and a first physical address mapped to the first logical address. In detail, the first mapping data MAP1 may include a first logical address value L1 corresponding to the first logical address and a first physical address value P1 corresponding to the first physical address. For example, the first mapping data MAP1 may be stored in a first cell string. In an embodiment, the first non-volatile memory 12 may store data obtained by encoding the first logical address value L1 and data obtained by encoding the first physical address value P1.

The second mapping data MAP2 may include a second logical address and a second physical address mapped to the second logical address. In detail, the second mapping data MAP2 may include a second logical address value L2 corresponding to the second logical address and a second physical address value P2 corresponding to the second physical address. For example, the second mapping data MAP2 may be stored in a second cell string. In an embodiment, the first non-volatile memory 12 may store data obtained by encoding the second logical address value L2 and data obtained by encoding the second physical address value P2.

The third mapping data MAP3 may include a third logical address and a third physical address mapped to the third logical address. In detail, the third mapping data MAP3 may include a third logical address value L3 corresponding to the third logical address and a third physical address value P3 corresponding to the third physical address. For example, the third mapping data MAP3 may be stored in a third cell string. In an embodiment, the first non-volatile memory 12 may store data obtained by encoding the third logical address value L3 and data obtained by encoding the third physical address value P3.

The fourth mapping data MAP4 may include a fourth logical address and a fourth physical address mapped to the fourth logical address. In detail, the fourth mapping data MAP4 may include a fourth logical address value L4 corresponding to the fourth logical address and a fourth physical address value P4 corresponding to the fourth physical address. For example, the fourth mapping data MAP4 may be stored in a fourth cell string. In an embodiment, the first non-volatile memory 12 may store data obtained by encoding the fourth logical address value L4 and data obtained by encoding the fourth physical address value P4.

Referring back to FIG. 1A, in an embodiment, the host 20 may transmit, to the storage device 10, a read request REQ_READ including a logical address, e.g., a logical block address (LBA). In response to the read request REQ_READ received from the host 20, the storage controller 11 may transmit the logical address, e.g., the LBA, to the first non-volatile memory 12. The first non-volatile memory 12 may search for a physical address, e.g., a physical block address (PBA), corresponding to the logical address and transmit a found physical address, e.g., a PBA, to the storage controller 11.

Subsequently, the storage controller 11 may generate a read command CMD_READ based on the physical address, e.g., the PBA, and transmit, to the second non-volatile memory 13, the read command CMD_READ including the physical address, e.g., the PBA. The second non-volatile memory 13 may read data based on the physical address, e.g., the PBA, and transmit the data to the storage controller 11. The storage controller 11 may transmit the data to the host 20.

As described above, the first non-volatile memory 12 may store the L2P mapping data D1 and perform an operation, i.e., an L2P operation, of searching for a physical address corresponding to a logical address in the L2P mapping data D1. Accordingly, it may not be necessary to load the L2P mapping data D1 to the memory 112 of the storage controller 11, and the number of read operations performed on the first non-volatile memory 12 to load the L2P mapping data D1 to the memory 112 and the data traffic between the first non-volatile memory 12 and the memory 112 may be reduced. In addition, the storage controller 11 may not need to perform an L2P operation, and the load of the storage controller 11 may be reduced.

Accordingly, even when the capacity of the memory 112 is not sufficient to store mapping data for each of the first non-volatile memory 12 and the second non-volatile memory 13, the storage device 10 may reduce the decrease in an operating speed while providing high-capacity storage. Consequently, the storage device 10 may increase the performance of memory operations, such as a write operation and a read operation.

The storage device 10 may include storage media for storing data at the request of the host 20. For example, the storage device 10 may include at least one selected from the group consisting of a solid-state drive (SSD), an embedded memory, and a removable external memory. When the storage device 10 is an SSD, the storage device 10 may comply with a non-volatile memory express standard. When the storage device 10 is an embedded memory or an external memory, the storage device 10 may comply with a universal flash storage (UFS) standard or an embedded multimedia card (eMMC) standard. Each of the host 20 and the storage device 10 may generate and transmit packets according to the standard protocol thereof.

Figure 1B:
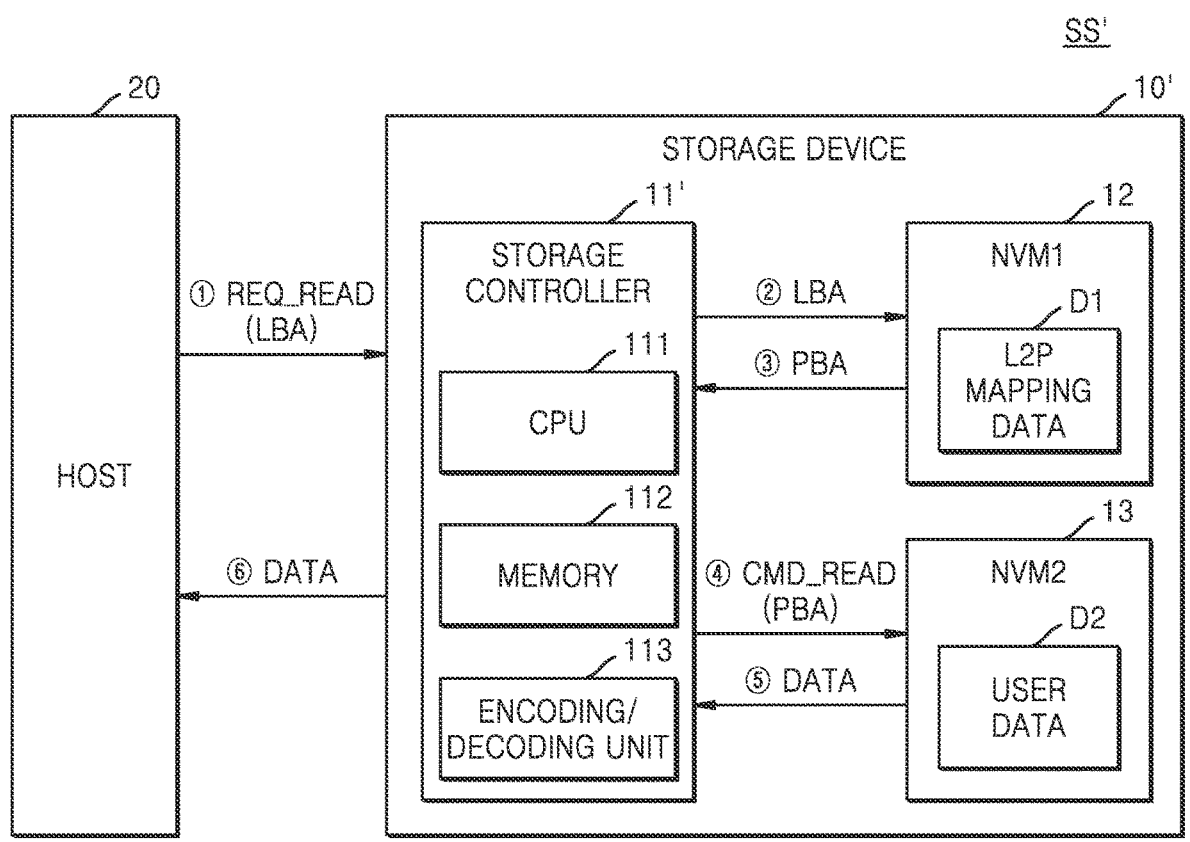
FIG. 1B is a block diagram of a storage system according to an embodiment.

FIG. 1B is a block diagram of a storage system SS' according to an embodiment.

Referring to FIG. 1B, the storage system SS' may include a storage device 10', which includes a storage controller 11', the first non-volatile memory 12, and the second non-volatile memory 13. The storage controller 11' may correspond to a modification of the storage controller 11 in FIG. 1A, and the descriptions given above with reference to FIG. 1A may also applied to the storage system SS'. The storage controller 11' may further include an encoding/decoding unit 113. In an embodiment, the first non-volatile memory 12 may transmit an encoded physical address to the storage controller 11', and the encoding/decoding unit 113 may generate an original physical address, i.e., a decoded physical address, by decoding the encoded physical address. In an embodiment, the first non-volatile memory 12 may transmit an encoded logical address to the storage controller 11', and the encoding/decoding unit 113 may generate an original logical address, i.e., a decoded logical address, by decoding the encoded logical address. The descriptions given above may also be applied to embodiments below.

Figure 3A:
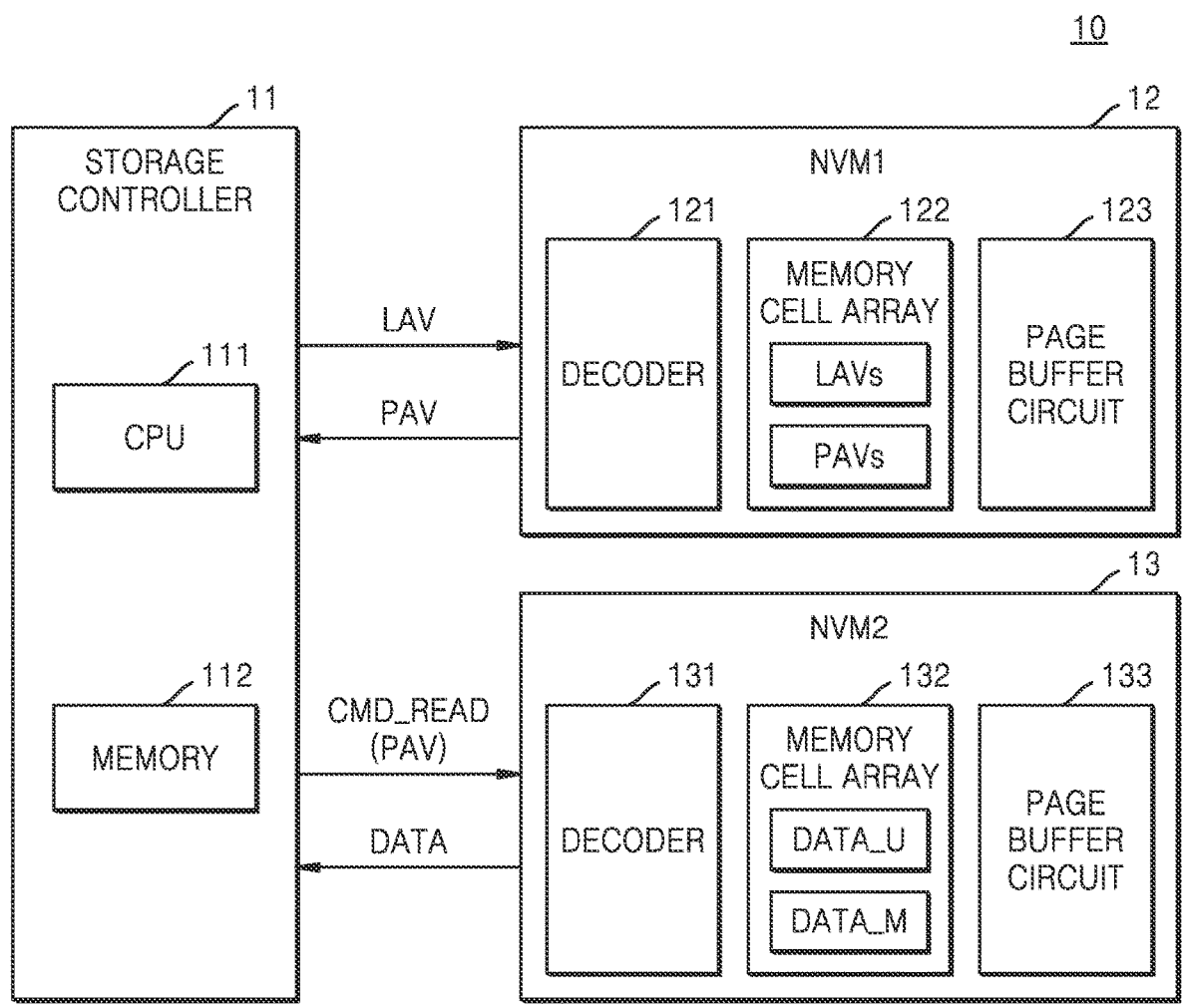
FIG. 3A is a detailed diagram of a storage device in FIG. 1A, according to an embodiment.

FIG. 3A is a detailed diagram of the storage device 10 in FIG. 1A, according to an embodiment.

Referring to FIG. 3A, the storage device 10 may include the storage controller 11, the first non-volatile memory 12, and the second non-volatile memory 13. According to an embodiment, the first non-volatile memory 12 and the second non-volatile memory 13 may be implemented by separate memory chips, separate memory dies, or separate memory planes from each other. In an embodiment, the first non-volatile memory 12 may be implemented by a first memory chip, the second non-volatile memory 13 may be implemented by a second memory chip, and the first and second memory chips may be included in one package. In an embodiment, the first non-volatile memory 12 may be implemented by a first memory die, the second non-volatile memory 13 may be implemented by a second memory die, and the first and second memory dies may be included in one chip or one package. In an embodiment, the first non-volatile memory 12 may be implemented by a first memory plane, the second non-volatile memory 13 may be implemented by a second memory plane, and the first and second memory planes may be included in one die, one chip, or one package. In an embodiment, the first non-volatile memory 12 may be implemented by a first memory block, the second non-volatile memory 13 may be implemented by a second memory block, and the first and second memory blocks may be included in one die, one chip, or one package.

The first non-volatile memory 12 may include a decoder 121, a memory cell array 122, and a page buffer circuit 123. The decoder 121 may generate data corresponding to a logical address value LAV, e.g., an LBA, which is received from the storage controller 11, by encoding the logical address value LAV and providing word line voltages corresponding to the data to the memory cell array 122. The memory cell array 122 may store logical address values LAVs and physical address values PAVs. For example, the memory cell array 122 may store data encoded from the logical address values LAVs and data encoded from the physical address values PAVs. The page buffer circuit 123 may buffer a physical address value PAV read from the memory cell array 122.

In an embodiment, the first non-volatile memory 12 may store encoded data of a logical address value LAV in a plurality of single-level cells (SLCs). In an embodiment, the first non-volatile memory 12 may duplicately store the encoded data of the logical address value LAV in memory cells of a plurality of cell strings respectively corresponding to a plurality of bit lines. In an embodiment, the first non-volatile memory 12 may store the logical address value LAV in at least one multi-level cell (MLC). For example, the MLC may store at least two bits of data.

In an embodiment, the first non-volatile memory 12 may store encoded data of a physical address value PAV in a plurality of SLCs. In an embodiment, the first non-volatile memory 12 may duplicately store the encoded data of the physical address value PAV in memory cells of a plurality of cell strings respectively corresponding to a plurality of bit lines. In an embodiment, the first non-volatile memory 12 may store the physical address value PAV in at least one MLC.

In an embodiment, the first non-volatile memory 12 may generate the logical address value LAV by decoding the encoded data of the logical address value LAV and providing the logical address value LAV to the storage controller 11. In an embodiment, the first non-volatile memory 12 may generate the physical address value PAV by decoding the encoded data of the physical address value PAV and providing the physical address value PAV to the storage controller 11. The second non-volatile memory 13 may include a decoder 131, a memory cell array 132, and a page buffer circuit 133. The decoder 131 may decode the read command CMD_READ received from the storage controller 11 and provide a word line voltage to a selected word line corresponding to the physical address value PAV, e.g., a PBA. The memory cell array 132 may store user data DATA_U and/or metadata DATA_M. The page buffer circuit 133 may buffer the user data DATA_U and/or the metadata DATA_M, which is read from the memory cell array 132.

Figure 3B:
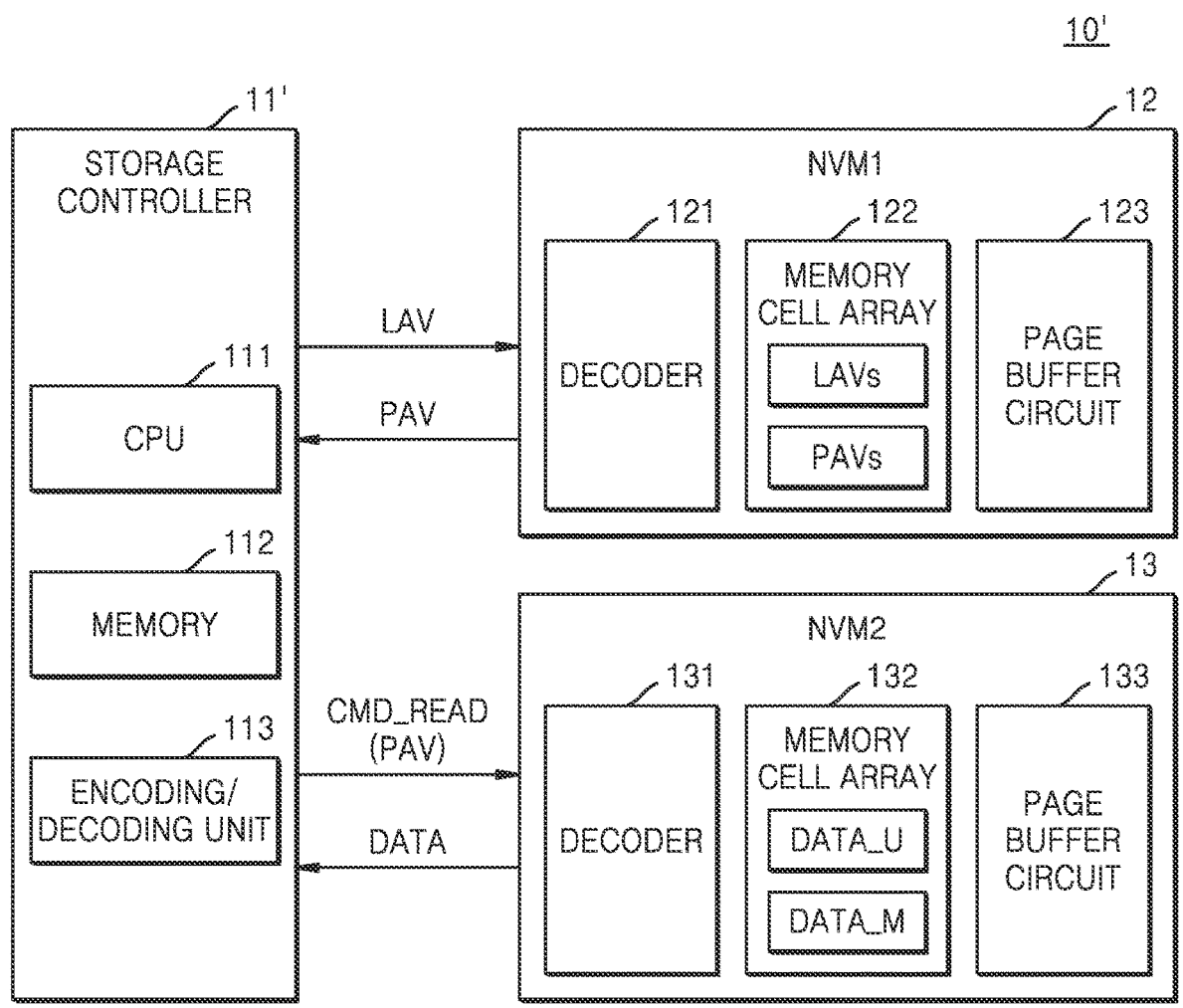
FIG. 3B is a detailed diagram of a storage device in FIG. 1B, according to an embodiment.

FIG. 3B is a detailed diagram of the storage device 10' in FIG. 1B, according to an embodiment.

Referring to FIG. 3B, the storage controller 11' may further include the encoding/decoding unit 113. The storage controller 11' may correspond to a modification of the storage controller 11 in FIG. 3A, and the descriptions given above with reference to FIG. 3A may also applied to the storage device 10'. In an embodiment, the first non-volatile memory 12 may provide encoded data of the logical address value LAV to the storage controller 11', and the encoding/decoding unit 113 of the storage controller 11' may generate the logical address value LAV by decoding the encoded data of the logical address value LAV. In an embodiment, the first non-volatile memory 12 may provide encoded data of the physical address value PAV to the storage controller 11', and the encoding/decoding unit 113 of the storage controller 11' may generate the physical address value PAV by decoding the encoded data of the physical address value PAV.

Figure 4:
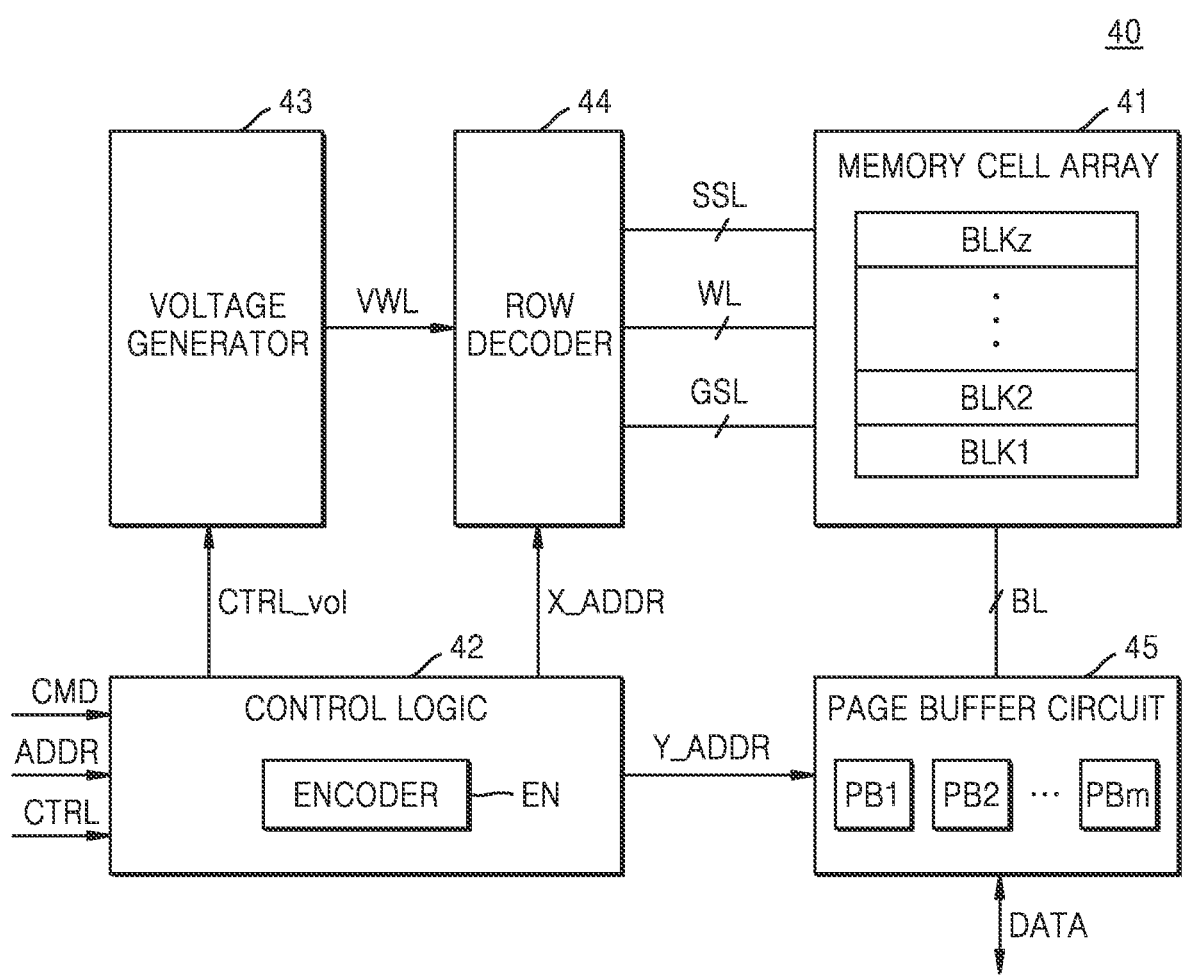
FIG. 4 is a block diagram of a non-volatile memory according to an embodiment.

FIG. 4 is a block diagram of a non-volatile memory 40 according to an embodiment.

Referring to FIG. 4, the non-volatile memory 40 may include a memory cell array 41, a control logic 42, a voltage generator 43, a row decoder 44, and a page buffer circuit 45. The non-volatile memory 40 may correspond to an implementation of the first non-volatile memory 12 in FIG. 3A. For example, the control logic 42, the voltage generator 43, and the row decoder 44 may correspond to the decoder 121 in FIG. 3A. For example, the memory cell array 41 and the page buffer circuit 45 may respectively correspond to the memory cell array 122 and the page buffer circuit 123 in FIG. 3A.

The memory cell array 41 may include a plurality of memory blocks BLK1 to BLKz. Each of the memory blocks BLK1 to BLKz may include a plurality of cell strings. Each of the cell strings may include a plurality of memory cells connected in series to each other. The memory cell array 41 may be connected to the page buffer circuit 45 through bit lines BL and connected to the row decoder 44 through word lines WL, string select lines SSL, and ground select lines GSL.

In an embodiment, the memory cell array 41 may include a three-dimensional (3D) memory cell array. The 3D memory cell array may include a plurality of cell strings. Each cell string may include memory cells respectively connected to word lines vertically stacked on a substrate. The disclosures of U.S. Pat. Nos. 7,679,133, 8,553,466, 8,654,587, 8,559,235, and U.S. Patent Application No. 2011/0233648 are incorporated herein in their entirety by reference.

In an embodiment, the memory cell array 41 may include flash memory. The flash memory may include a two-dimensional (2D) NAND memory array or a 3D (or vertical) NAND (V-NAND) memory array. In an embodiment, the memory cell array 41 may include magnetic RAM (MRAM), spin-transfer torque MRAM, conductive bridging RAM (CBRAM), ferroelectric RAM (FeRAM), phase change RAM (PRAM), resistive RAM (RRAM), or other various types of memory.

At least some of the memory blocks BLK1 to BLKz may store logical address values, physical address values, and/or validity information that indicates validity of a mapping relationship between a logical address and a physical address. In an embodiment, a logical address value may be set to a certain value and thus be invalidated, and invalidation of a mapping relationship may be indicated by applying a certain voltage to a word line. In an embodiment, pieces of mapping information respectively corresponding to different logical addresses may be stored in the memory blocks BLK1 to BLKz.

Referring to FIGS. 2 and 4, for example, the first logical address value L1 and the first physical address value P1 corresponding thereto may be stored in the memory block BLK1, the second logical address value L2 and the second physical address value P2 corresponding thereto may be stored in the memory block BLK2, and the third logical address value L3 and the third physical address value P3 corresponding thereto may be stored in the memory block BLK3. In some embodiments, user data may be stored in the other memory blocks BLK4 to BLKz.

Referring back to FIG. 4, the control logic 42 may generally control various operations of the non-volatile memory 40. The control logic 42 may output various control signals in response to a command CMD, an address ADDR, and/or a control signal CTRL. For example, the control logic 42 may output a voltage control signal CTRL_vol, a row address X_ADDR, and a column address Y_ADDR. In an embodiment, the control logic 42 may include an encoder EN. The encoder EN may generate data by encoding a logical address value, which may be received from the storage controller 11. The encoder EN may also generate data by encoding a physical address value, which may be received from the storage controller 11. The control logic 42 may further include a decoder corresponding to the encoder EN. The decoder may generate a logical address value and/or a physical address value by decoding data received from the page buffer circuit 45.

The voltage generator 43 may generate various voltages for performing program, read, and erase operations, based on the voltage control signal CTRL_vol. For example, the voltage generator 43 may generate a program voltage, a read voltage, a program verify voltage, an erase voltage, and the like from a word line voltage VWL. The row decoder 44 may select at least one of the word lines WL in response to the row address X_ADDR and select one of the string select lines SSL. For example, in a program operation, a search operation, or read operation, the row decoder 44 may apply the word line voltage VWL to the selected word line. The page buffer circuit 45 may select at least one of the bit lines BL in response to the column address Y_ADDR. The page buffer circuit 45 may operate as a write driver or a sense amplifier according to an operation mode. The page buffer circuit 45 may include a plurality of page buffers PB1 to PBm respectively connected to the bit lines BL, where "m" is a positive integer.

The second non-volatile memory 13 in FIGS. 1A and 3A may be implemented in a manner similar to the non-volatile memory 40. For example, the second non-volatile memory 13 may include the memory cell array 41, the control logic 42, the voltage generator 43, the row decoder 44, and the page buffer circuit 45. For example, the row decoder 44 may correspond to the decoder 131 in FIG. 3A. For example, the memory cell array 41 and the page buffer circuit 45 may respectively correspond to the memory cell array 132 and the page buffer circuit 133 in FIG. 3A. The control logic 42 included in the second non-volatile memory 13 may not include the encoder EN.

Figure 5:
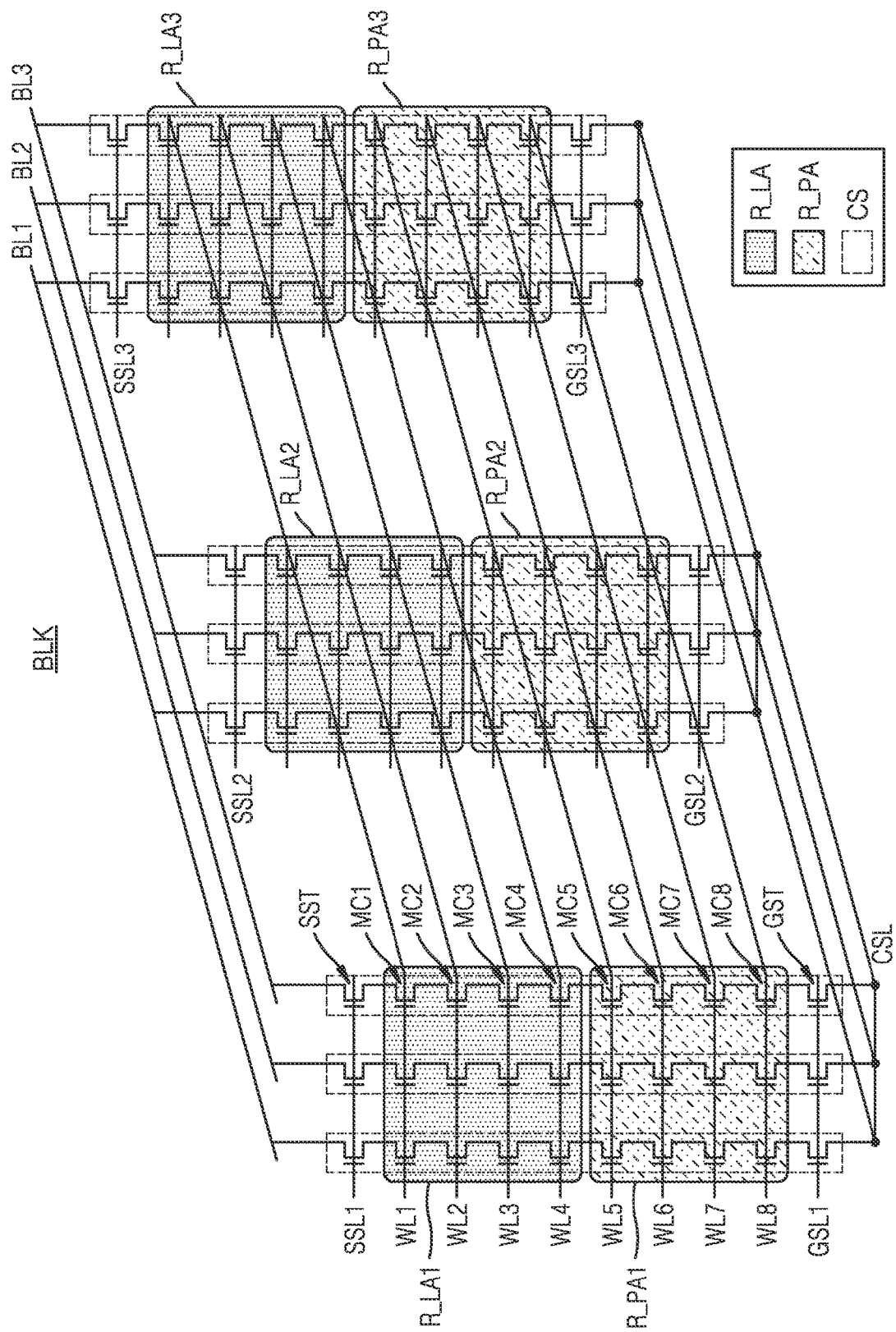
FIG. 5 is a circuit diagram of a memory block according to an embodiment.

FIG. 5 is a circuit diagram of a memory block BLK according to an embodiment.

Referring to FIG. 5, the memory block BLK may correspond to one of the memory blocks BLK1 to BLKz. The memory block BLK may include a plurality of cell strings CS. Each of the cell strings CS may include a string select transistor SST, a plurality of memory cells MC1 to MC8, and a ground select transistor GST, which are connected in series to one another. The string select transistor SST, the memory cells MC1 to MC8, and the ground select transistor GST, which are included in each cell string CS, may be stacked on a substrate in a vertical direction.

The string select transistor SST may be connected to one of first to third string select lines SSL1 to SSL3. The memory cells MC1 to MC8 may be respectively connected to word lines WL1 to WL8. The ground select transistor GST may be connected to one of ground select lines GSL1 to GSL3. The string select transistor SST may be connected to one of bit lines BL1 to BL3, and the ground select transistor GST may be connected to a common source line CSL. Here, the numbers of cell strings CS, word lines, bit lines, ground select lines, and string select lines may vary with embodiments.

In an embodiment, the memory block BLK may include a plurality of logical address value storage regions R_LA1 to R_LA3 and a plurality of physical address value storage regions R_PA1 to R_PA3. For example, the logical address value storage regions R_LA1 to R_LA3 may include SLCs that store encoded data of a logical address value. For example, the physical address value storage regions R_PA1 to R_PA3 may include SLCs that store encoded data of a physical address value.

For example, the logical address value storage region R_LA1 may include memory cells, which correspond to the first string select line SSL1 and are connected to the word lines WL1 to WL4, and the physical address value storage region R_PA1 may include memory cells, which correspond to the first string select line SSL1 and are connected to the word lines WL5 to WL8. For example, the logical address value storage region R_LA2 may include memory cells, which correspond to the second string select line SSL2 and are connected to the word lines WL1 to WL4, and the physical address value storage region R_PA2 may include memory cells, which correspond to the second string select line SSL2 and are connected to the word lines WL5 to WL8. For example, the logical address value storage region R_LA3 may include memory cells, which correspond to the third string select line SSL3 and are connected to the word lines WL1 to WL4, and the physical address value storage region R_PA3 may include memory cells, which correspond to the third string select line SSL3 and are connected to the word lines WL5 to WL8.

FIG. 6 is a table showing address values and data corresponding to the address values, according to an embodiment.

Referring to FIGS. 1A to 4 and FIG. 6, the control logic 42 may generate data by encoding a logical address value. In an embodiment, the non-volatile memory 40 may receive a logical address value in decimal from the storage controller 11, and the control logic 42 may convert the logical address value in decimal into a first value in binary and generate data by encoding the first value. For example, the encoder EN may generate data by encoding "0" in the first value into "01" and "1" in the first value into "10". For example, logical address value "0" may be converted into first value "00", and the encoder EN may generate data "0101" by encoding the first value "00". For example, logical address value "2" may be converted into first value "10", and the encoder EN may generate data "1001" by encoding the first value "10". For example, logical address value "1" may be converted into first value "01", and the encoder EN may generate data "0110" by encoding the first value "01". For example, logical address value "3" may be converted into first value "11", and the encoder EN may generate data "1010" by encoding the first value "11".

However, embodiments are not limited thereto. The non-volatile memory 40 may receive a logical address value in binary from the storage controller 11, and the control logic 42 may generate data by encoding the binary logical address value. For example, the encoder EN may generate data by encoding "0" in the logical address value into "01" and "1" in the logical address value into "10".

In an embodiment, the non-volatile memory 40 may receive a physical address value in decimal from the storage controller 11, and the control logic 42 may convert the physical address value in decimal into a first value in binary and generate data by encoding the first value. The encoder EN may generate data by encoding "0" in the first value into "01" and "1" in the first value into "10". However, embodiments are not limited thereto. The non-volatile memory 40 may receive a physical address value in binary from the storage controller 11, and the control logic 42 may generate data by encoding the binary physical address value. For example, the encoder EN may generate data by encoding "0" in the physical address value into "01" and "1" in the physical address value into "10".

Figure 7A:
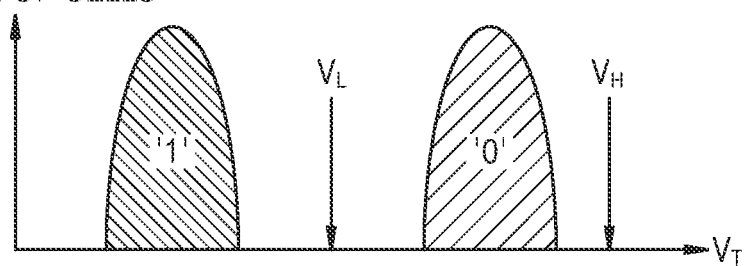
FIG. 7A illustrates threshold voltage distributions of memory cells, according to an embodiment.

FIG. 7A illustrates threshold voltage distributions of memory cells, according to an embodiment.

Referring to FIG. 7A, the threshold voltage distribution of memory cells may be expressed as the number of memory cells with respect to a threshold voltage $V_T$. Each memory cell may correspond to an SLC that stores data "1" or "0". A memory cell storing data "1" may have a threshold voltage corresponding to a first threshold voltage range, and a memory cell storing data "0" may have a threshold voltage corresponding to a second threshold voltage range. The upper limit of the first threshold voltage range may be lower than a voltage level of a first voltage $V_L$. The lower limit of the second threshold voltage range may be higher than the voltage level of the first voltage $V_L$, and the upper limit of the second threshold voltage range may be lower than a voltage level of a second voltage $V_H$.

Figure 7B:
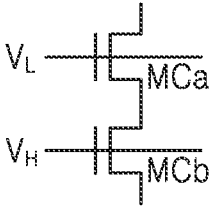
FIG. 7B illustrates a data search method according to an embodiment.

FIG. 7B illustrates a data search method according to an embodiment.

Referring to FIG. 7B, data corresponding to an address value may be stored by using memory cells MCa and MCb connected in series to each other. For example, data "10" corresponding to address value "1" may be stored in the memory cells MCa and MCb by storing data "1" in the memory cell MCa and data "0" in the memory cell MCb. For example, data "01" corresponding to address value "0" may be stored in the memory cells MCa and MCb by storing data "0" in the memory cell MCa and data "1" in the memory cell MCb. For example, data "00" indicating no data may be stored in the memory cells MCa and MCb by storing data "0" in the memory cell MCa and data "0" in the memory cell MCb.

FIG. 7C is a table showing a current flow according to data stored in a memory cell, according to an embodiment.

Referring to FIGS. 7B and 7C, for example, to search for a logical address value LAV of 1 (i.e., "01"), the first voltage $V_L$ may be applied to a word line connected to the memory cell MCa, and the second voltage $V_H$ may be applied to a word line connected to the memory cell MCb. When the logical address value LAV stored in the memory cells MCa and MCb is 1 (i.e., "01"), current may flow through the memory cells MCa and MCb. On the other hand, when the logical address value LAV stored in the memory cells MCa and MCb is not 1 (i.e., not "01"), current may not flow through the memory cells MCa and MCb. For example, to search for a logical address value LAV of 0 (i.e., "00"), the second voltage $V_H$ may be applied to a word line connected to the memory cell MCa, and the first voltage $V_L$ may be applied to a word line connected to the memory cell MCb. When the logical address value LAV stored in the memory cells MCa and MCb is 0 (i.e., "00"), current may flow through the memory cells MCa and MCb. On the other hand, when the logical address value LAV stored in the memory cells MCa and MCb is not 0 (i.e., not "00"), current may not flow through the memory cells MCa and MCb. When the second voltage $V_H$ is applied to word lines respectively connected to the memory cells MCa and MCb, current may flow through the memory cells MCa and MCb regardless of the logical address value LAV stored in the memory cells MCa and MCb.

Figure 8:
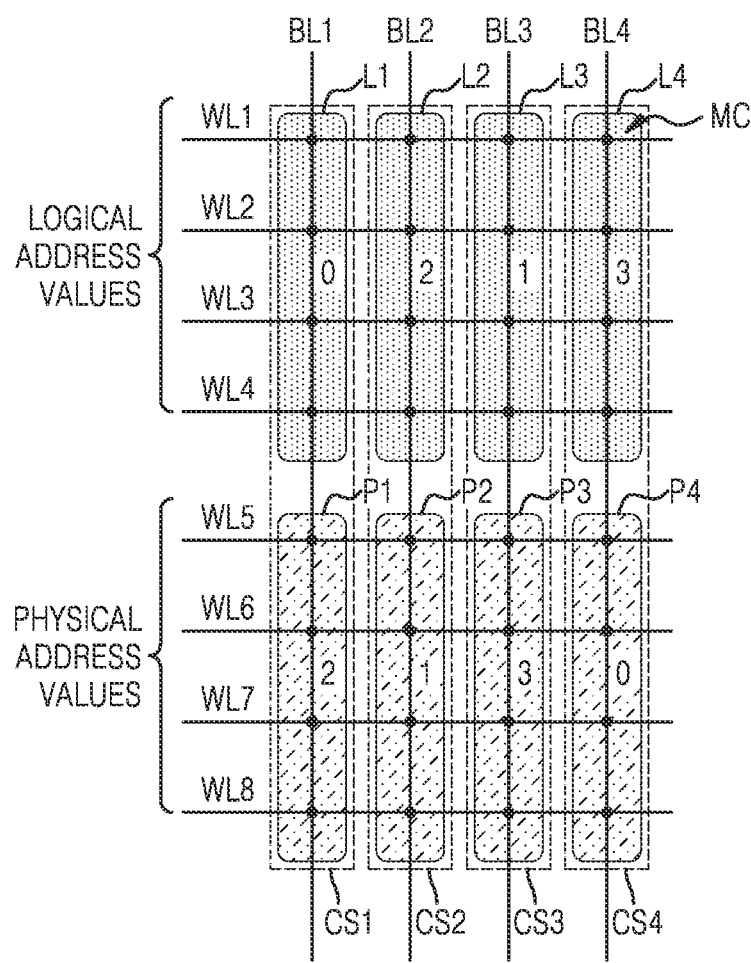
FIG. 8 illustrates a non-volatile memory storing a logical address value and a physical address value, according to an embodiment.

FIG. 8 illustrates a non-volatile memory 80 storing a logical address value and a physical address value, according to an embodiment.

Referring to FIG. 8, the non-volatile memory 80 may store logical address values and physical address values. The non-volatile memory 80 may correspond to an example of the first non-volatile memory 12 in FIGS. 1A and 3A or an example of the non-volatile memory 40 of FIG. 4. The non-volatile memory 80 may include a plurality of memory cells MC respectively in regions in which the word lines WL1 to WL8 intersect with bit lines BL1 to BL4.

For example, logical address values may be stored in first memory cells connected to a first group of the word lines WL1 to WL4, and physical address values may be stored in second memory cells connected to a second group of the word lines WL5 to WL8. For example, each of the first and second memory cells may correspond to an SLC. The numbers of word lines in the first group and first memory cells corresponding to a logical address value may vary with embodiments. The numbers of word lines in the second group and second memory cells corresponding to a physical address value may also vary with embodiments.

In an embodiment, the non-volatile memory 80 may include a plurality of cell strings, e.g., first to fourth cell strings CS1 to CS4, respectively connected to the bit lines BL1 to BL4. For example, the first to fourth cell strings CS1 to CS4 may be included in one memory block. However, embodiments are not limited thereto. The first to fourth cell strings CS1 to CS4 may be divided into a plurality of groups, which may be included in different memory blocks.

The first cell string CS1 may include first memory cells, which store the first logical address value L1 and are respectively connected to the word lines WL1 to WL4 in the first group, and second memory cells, which store the first physical address value P1 and are respectively connected to the word lines WL5 to WL8 in the second group. For example, the first logical address value L1 may be 0 and the first physical address value P1 may be 2. The second cell string CS2 may include first memory cells, which store the second logical address value L2 and are respectively connected to the word lines WL1 to WL4 in the first group, and second memory cells, which store the second physical address value P2 and are respectively connected to the word lines WL5 to WL8 in the second group. For example, the second logical address value L2 may be 2 and the second physical address value P2 may be 1.

The third cell string CS3 may include first memory cells, which store the third logical address value L3 and are respectively connected to the word lines WL1 to WL4 in the first group, and second memory cells, which store the third physical address value P3 and are respectively connected to the word lines WL5 to WL8 in the second group. For example, the third logical address value L3 may be 1 and the third physical address value P3 may be 3. The fourth cell string CS4 may include first memory cells, which store the fourth logical address value L4 and are respectively connected to the word lines WL1 to WL4 in the first group, and second memory cells, which store the fourth physical address value P4 and are respectively connected to the word lines WL5 to WL8 in the second group. For example, the fourth logical address value L4 may be 3 and the fourth physical address value P4 may be 0. The descriptions of the first to fourth cell strings CS1 to CS4 given above may also be applied to embodiments below.

In an embodiment, the non-volatile memory 80 may include a plurality of memory blocks and apply word line voltages corresponding to a logical address value to more than one of the memory blocks at the same time. Accordingly, an address search operation or an L2P operation may be performed in parallel on a plurality of memory blocks, and the time taken for the address search operation or the L2P operation may be reduced.

Figure 9:
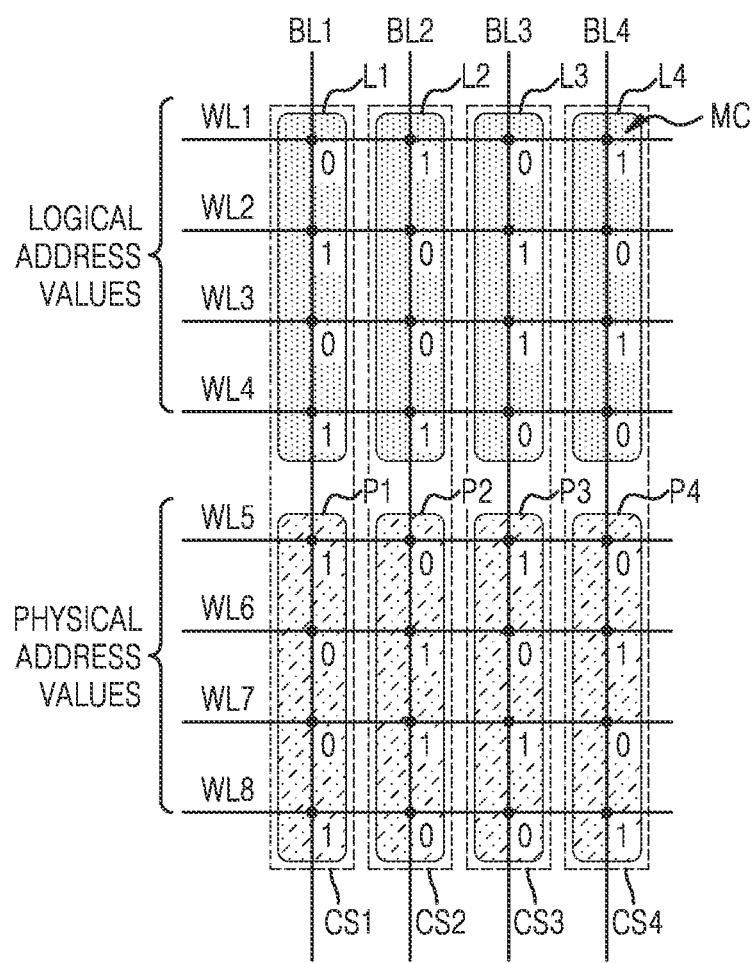
FIG. 9 illustrates a non-volatile memory programmed with data corresponding to a logical address value and data corresponding to a physical address value, according to an embodiment.

FIG. 9 illustrates a non-volatile memory 90 programmed with data corresponding to a logical address value and data corresponding to a physical address value, according to an embodiment.

Referring to FIGS. 3A and 9, first memory cells storing logical address values may be respectively implemented by first SLCs, and second memory cells storing physical address values may be respectively implemented by second SLCs. For example, the control logic 42 may generate data "0101" by encoding 0 corresponding to the first logical address value L1 and generate data "1001" by encoding 2 corresponding to the first physical address value P1. Accordingly, the first logical address value L1 may be stored as the data "0101" in first SLCs and the first physical address value P1 may be stored as the data "1001" in second SLCs. For example, the control logic 42 may generate data "1001" by encoding 2 corresponding to the second logical address value L2 and generate data "0110" by encoding 1 corresponding to the second physical address value P2. Accordingly, the second logical address value L2 may be stored as the data "1001" in first SLCs and the second physical address value P2 may be stored as the data "0110" in second SLCs.

For example, the control logic 42 may generate data "0110" by encoding 1 corresponding to the third logical address value L3 and generate data "1010" by encoding 3 corresponding to the third physical address value P3. Accordingly, the third logical address value L3 may be stored as the data "0110" in first SLCs and the third physical address value P3 may be stored as the data "1010" in second SLCs. For example, the control logic 42 may generate data "1010" by encoding 3 corresponding to the fourth logical address value L4 and generate data "0101" by encoding 0 corresponding to the fourth physical address value P4. Accordingly, the fourth logical address value L4 may be stored as the data "1010" in first SLCs and the fourth physical address value P4 may be stored as the data "0101" in second SLCs.

A physical address value search operation of the non-volatile memory 90 is described below. In an embodiment, the physical address value search operation of the non-volatile memory 90 may include a two-stage read operation. In detail, the two-stage read operation may include a first stage of searching for a cell string that stores a logical address value LAV and a second stage of reading a physical address value PAV from the found cell string.

In the first stage, to search for the cell string that stores the logical address value LAV received from the storage controller 11, word lines voltages corresponding to the logical address value LAV may be applied to the word lines WL1 to WL4 in the first group, and accordingly, only first memory cells that store the logical address value LAV may be turned on. In an embodiment, a pass voltage may be applied to the word lines WL5 to WL8 in the second group, and accordingly, all of the second memory cells may be turned on regardless of data stored therein. Accordingly, current may flow only in the cell string that stores the logical address value LAV among the first to fourth cell strings CS1 to CS4, and the cell string storing the logical address value LAV may be found.

However, embodiments are not limited to those described above. In some embodiments, the word lines voltages corresponding to the logical address value LAV may be applied to the word lines WL1 to WL4 in the first group, but the pass voltage may not be applied to the word lines WL5 to WL8 in the second group. In a state where only the first memory cells storing the logical address value LAV are turned on, the voltage level of each of the bit lines BL1 to BL4 may be reduced by charge sharing. A cell string corresponding to a bit line having the reduced voltage level that is greater than or equal to a reference level among the bit lines BL1 to BL4 may be determined to be the cell string that stores the logical address value LAV. Alternatively, a cell string corresponding to a bit line having the greatest reduced voltage level among the bit lines BL1 to BL4 may be determined to be the cell string that stores the logical address value LAV.

In the second stage, a normal read operation may be performed only on the cell string that stores the logical address value LAV to read the physical address value PAV. In an embodiment, when only the bit line storing the logical address value LAV is activated, the physical address value PAV may be read from the second memory cells of the selected cell string. In an embodiment, when the cell string connected to the bit line having the reduced voltage level that is greater than or equal to the reference level is selected, only the cell string storing the logical address value LAV may be selected and a voltage may be applied to the bit line connected to the selected cell string. Cell strings that do not store the logical address value LAV are not selected, and accordingly, a voltage may not be applied to bit lines respectively connected to the unselected cell strings. As a result, power consumption caused by a read operation may be reduced. The physical address value read operation of a non-volatile memory is described in detail with reference to FIGS. 10 to 13 below.

The logical address value search operation of the non-volatile memory 80 may also include a two-stage read operation. In detail, the two-stage read operation may include a first stage of searching for a cell string that stores the physical address value PAV and a second stage of reading the logical address value LAV from the found cell string. The logical address value read operation of a non-volatile memory is described in detail with reference to FIG. 14 below.

Figure 10:
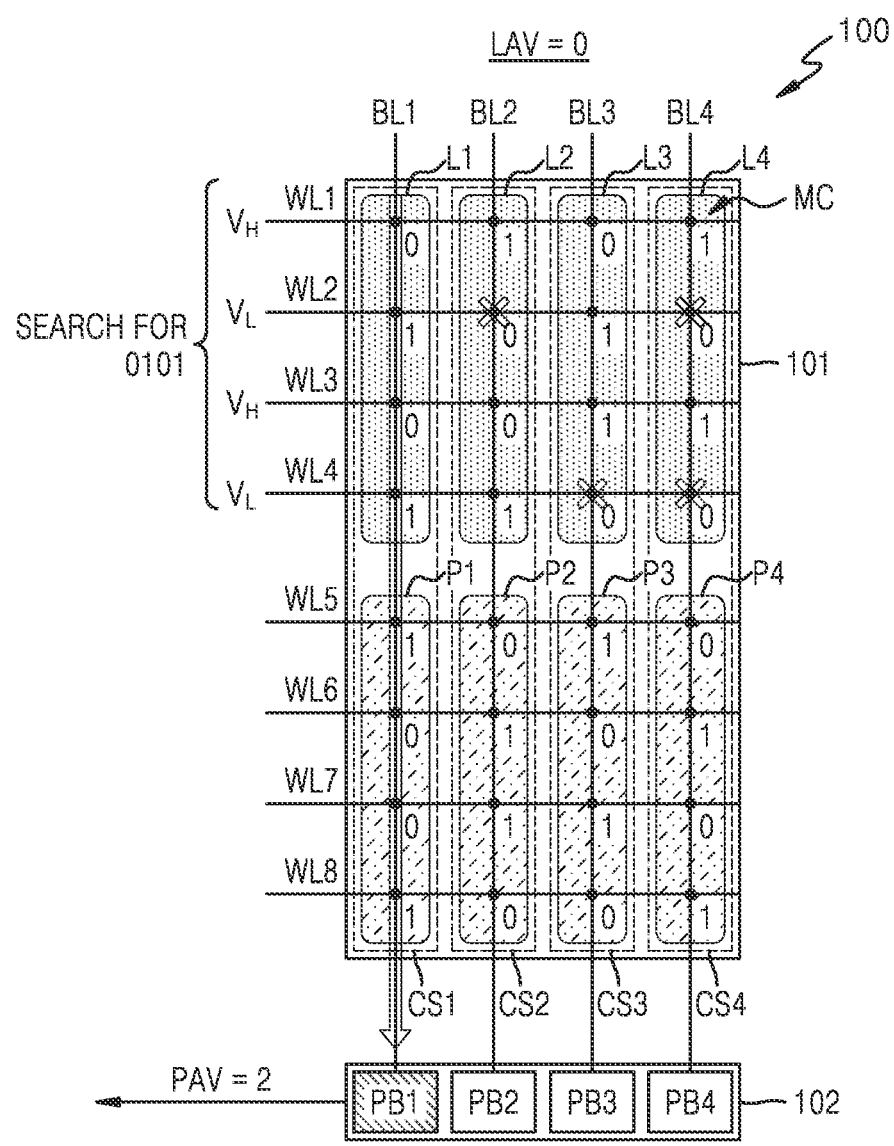
FIG. 10 illustrates a read operation of a non-volatile memory when a logical address value is 0, according to an embodiment.

FIG. 10 illustrates a read operation of a non-volatile memory 100 when the logical address value LAV is 0, according to an embodiment. For example, the non-volatile memory 100 may correspond to an example of the first non-volatile memory 12 in FIG. 1A.

Referring to FIGS. 3A and 10, when the logical address value LAV received from the storage controller 11 is 0, the non-volatile memory 100 may encode the logical address value LAV "0" into data "0101". Subsequently, to search for a cell string corresponding to the logical address value LAV "0", word line voltages, i.e., $V_H$, $V_L$, $V_H$, and $V_L$, corresponding to the data "0101" may be respectively applied to the word lines WL1 to WL4 in the first group. First memory cells storing data "0" among first memory cells connected to the word line WL2 may be turned off, and first memory cells storing data "0" among first memory cells connected to the word line WL4 may be turned off. In addition, first memory cells storing the first logical address value L1 corresponding to the logical address value LAV "0" may be turned on, and accordingly, current may flow in the first cell string CS1, current may not flow in the second to fourth strings CS2 to CS4, and the first cell string CS1 may be selected as the cell string that stores the logical address value LAV.

Subsequently, a normal read operation may be performed on the second memory cells of the first cell string CS1 that has been selected. Read voltages applied to the word lines WL5 to WL8 in the second group may be changed, and data stored in the second memory cells of the selected first cell string CS1 may be read. The data read from the second memory cells of the first cell string CS1 may correspond to the first physical address value P1, e.g., 2, and may be stored in a first page buffer PB1. The first physical address value P1 stored in the first page buffer PB1 may be transmitted to the storage controller 11.

The normal read operation performed on the second memory cells of the first cell string CS1 is described in detail below. In an embodiment, a read operation may be sequentially performed on the second memory cells respectively connected to the word lines WL5 to WL8 by sequentially applying a read voltage to the word lines WL5 to WL8, and data sequentially read from the second memory cells may be stored in the first page buffer PB1. The data stored in the first page buffer PB1 may be decoded into a physical address value, and the physical address value may be transmitted to the storage controller 11.

For example, a read voltage may be applied to the word line WL5 so that data "1" may be read from the second memory cell connected to the word line WL5 and stored in the first page buffer PB1. Subsequently, a read voltage may be applied to the word line WL6 so that data "0" may be read from the second memory cell connected to the word line WL6 and stored in the first page buffer PB1. Subsequently, a read voltage may be applied to the word line WL7 so that data "0" may be read from the second memory cell connected to the word line WL7 and stored in the first page buffer PB1. Subsequently, a read voltage may be applied to the word line WL8 so that data "1" may be read from the second memory cell connected to the word line WL8 and stored in the first page buffer PB1. As described above, the data "1001" sequentially read from the second memory cells may be decoded into physical address value "2". For example, the control logic 42 may receive the data "1001" from the first page buffer PB1, decode the data "1001" into the physical address value "2", and transmit the physical address value "2" to the storage controller 11.

However, embodiments are not limited to those described above. In some embodiments, a read operation may be performed on the second memory cells of the first to fourth cell strings CS1 to CS4 in units of pages, and a page buffer circuit 102 may store data of the entire page. For example, only the data stored in the first cell string CS1 that has been selected may be decoded into a physical address value, and the physical address value may be transmitted to the storage controller 11.

In an embodiment, the non-volatile memory 100 may include a plurality of memory blocks and apply word lines voltages corresponding to data "0101" to more than one of the memory blocks at the same time, thereby reducing the time taken for searching for cell strings that store the logical address value LAV "0".

Figure 11:
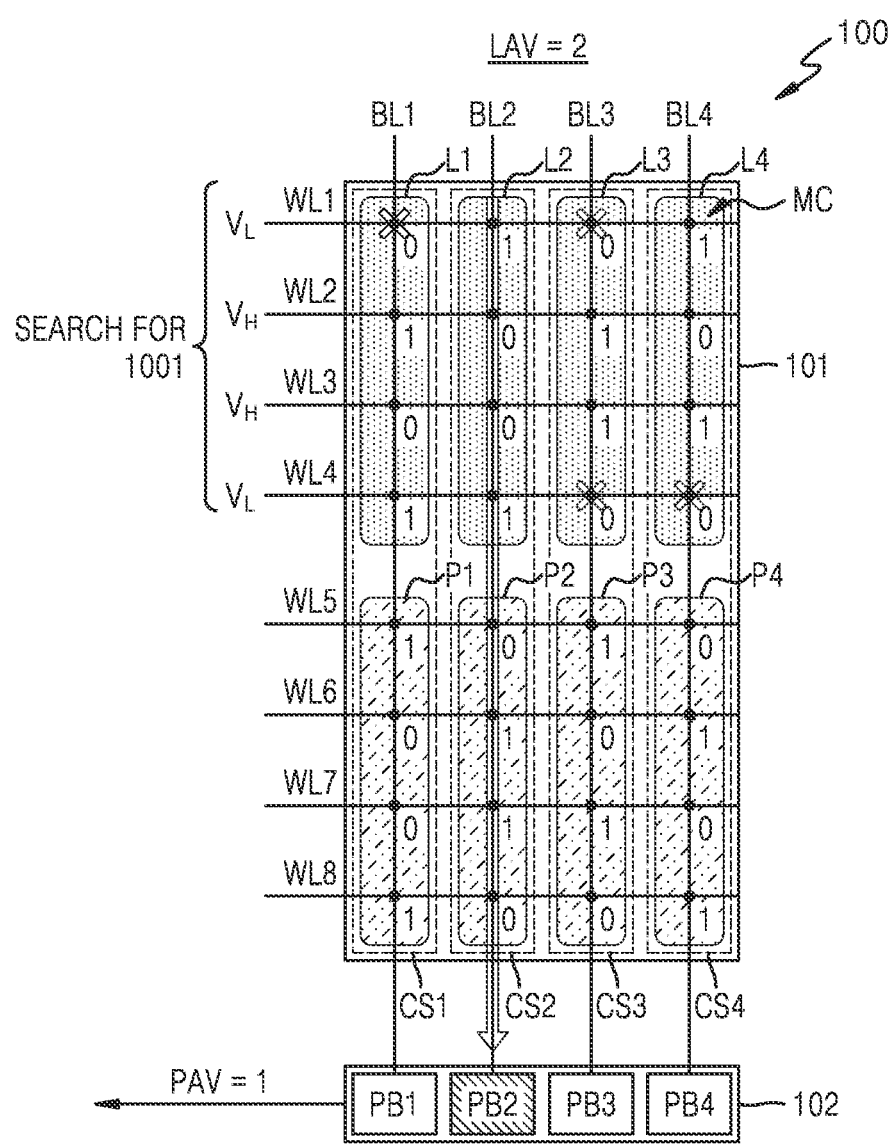
FIG. 11 illustrates a read operation of a non-volatile memory when a logical address value is 2, according to an embodiment.

FIG. 11 illustrates a read operation of the non-volatile memory 100 when the logical address value LAV is 2, according to an embodiment.

Referring to FIGS. 3A and 11, when the logical address value LAV received from the storage controller 11 is 2, the non-volatile memory 100 may encode the logical address value LAV "2" into data "1001". Subsequently, to search for a cell string corresponding to the logical address value LAV "2", word line voltages, i.e., $V_L$, $V_H$, $V_H$, and $V_L$, corresponding to the data "1001" may be respectively applied to the word lines WL1 to WL4 in the first group. First memory cells storing data "0" among first memory cells connected to the word line WL1 may be turned off, and first memory cells storing data "0" among first memory cells connected to the word line WL4 may be turned off. Moreover, first memory cells storing the second logical address value L2 corresponding to the logical address value LAV "2" may be turned on, and accordingly, current may flow in the second cell string CS2, current may not flow in the first, third and fourth strings CS1, CS3 and CS4, and the second cell string CS2 may be selected as the cell string that stores the logical address value LAV.

Subsequently, a normal read operation may be performed on the second memory cells of the second cell string CS2 that has been selected. Read voltages applied to the word lines WL5 to WL8 in the second group may be changed, and data stored in the second memory cells of the selected second cell string CS2 may be read. The data read from the second memory cells of the second cell string CS2 may correspond to the second physical address value P2, e.g., 1, and may be stored in a second page buffer PB2. The second physical address value P2 stored in the second page buffer PB2 may be transmitted to the storage controller 11.

The normal read operation performed on the second memory cells of the second cell string CS2 is described in detail below. For example, a read voltage may be applied to the word line WL5 so that data "0" may be read from the second memory cell connected to the word line WL5 and stored in the second page buffer PB2. Subsequently, a read voltage may be applied to the word line WL6 so that data "1" may be read from the second memory cell connected to the word line WL6 and stored in the second page buffer PB2.

Subsequently, a read voltage may be applied to the word line WL7 so that data "1" may be read from the second memory cell connected to the word line WL7 and stored in the second page buffer PB2. Subsequently, a read voltage may be applied to the word line WL8 so that data "0" may be read from the second memory cell connected to the word line WL8 and stored in the second page buffer PB2. As described above, the data "0110" sequentially read from the second memory cells may be decoded into physical address value "1". For example, the control logic 42 may receive the data "0110" from the second page buffer PB2, decode the data "0110" into the physical address value "1", and transmit the physical address value "1" to the storage controller 11.

However, embodiments are not limited to those described above. In some embodiments, a read operation may be performed on the second memory cells of the first to fourth cell strings CS1 to CS4 in units of pages, and the page buffer circuit 102 may store data of the entire page. For example, only the data stored in the second cell string CS2 that has been selected may be decoded into a physical address value, and the physical address value may be transmitted to the storage controller 11.

In an embodiment, the non-volatile memory 100 may include a plurality of memory blocks and apply word lines voltages corresponding to data "1001" to more than one of the memory blocks at the same time, thereby reducing the time taken for searching for cell strings that store the logical address value LAV "2".

Figure 12:
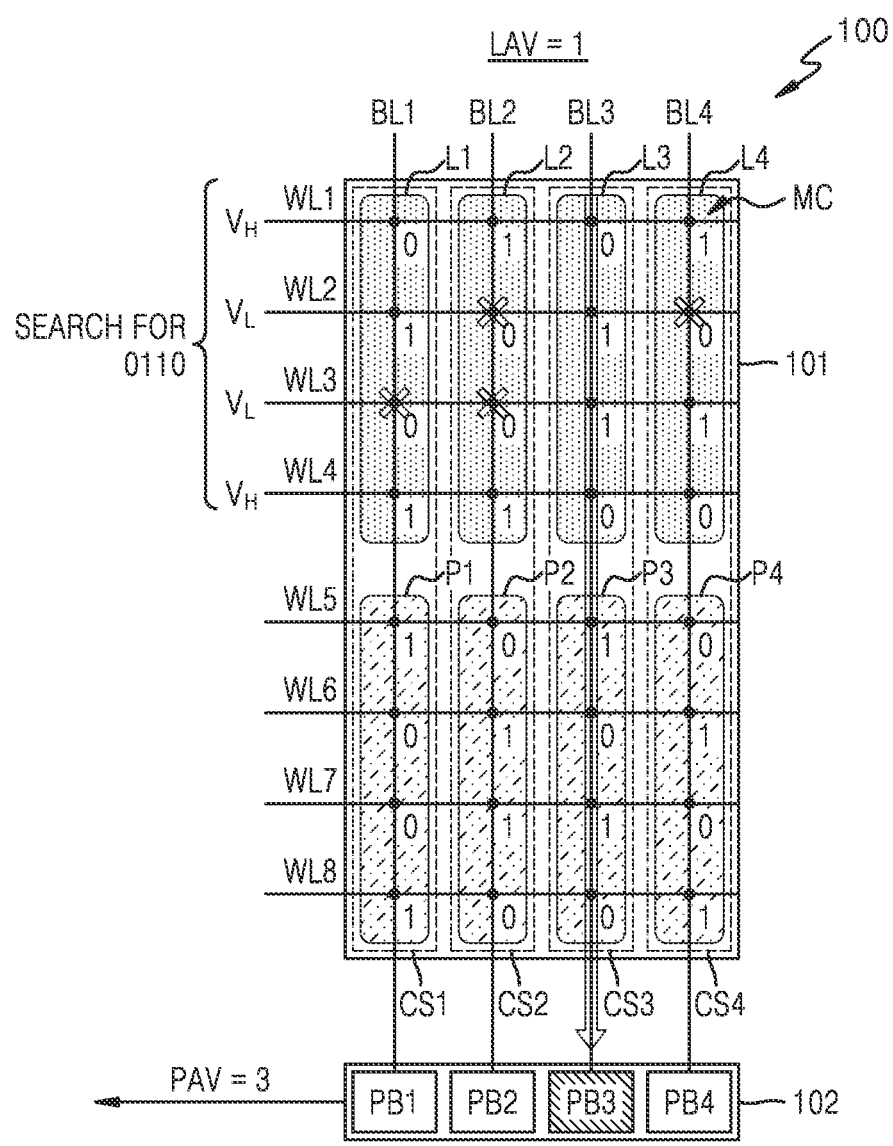
FIG. 12 illustrates a read operation of a non-volatile memory when a logical address value is 1, according to an embodiment.

FIG. 12 illustrates a read operation of the non-volatile memory 100 when the logical address value LAV is 1, according to an embodiment.

Referring to FIGS. 3A and 12, when the logical address value LAV received from the storage controller 11 is 1, the non-volatile memory 100 may encode the logical address value LAV "1" into data "0110". Subsequently, to search for a cell string corresponding to the logical address value LAV "1", word line voltages, i.e., $V_H$, $V_L$, $V_L$, and $V_H$, corresponding to the data "0110" may be respectively applied to the word lines WL1 to WL4 in the first group. First memory cells storing data "0" among first memory cells connected to the word line WL2 may be turned off, and first memory cells storing data "0" among first memory cells connected to the word line WL3 may be turned off. First memory cells storing the third logical address value L3 corresponding to the logical address value LAV "1" may be turned on, and accordingly, current may flow in the third cell string CS3, current may not flow in the first, second and fourth strings CS1, CS2 and CS4, and the third cell string CS3 may be selected as the cell string that stores the logical address value LAV. Subsequently, a normal read operation may be performed on the second memory cells of the third cell string CS3 that has been selected. Read voltages applied to the word lines WL5 to WL8 in the second group may be changed, and data stored in the second memory cells of the selected third cell string CS3 may be read. The data read from the second memory cells of the third cell string CS3 may correspond to the third physical address value P3, e.g., 3, and may be stored in a third page buffer PB3. The third physical address value P3 stored in the third page buffer PB3 may be transmitted to the storage controller 11.

The normal read operation performed on the second memory cells of the third cell string CS3 is described in detail below. For example, a read voltage may be applied to the word line WL5 so that data "1" may be read from the second memory cell connected to the word line WL5 and stored in the third page buffer PB3. Subsequently, a read voltage may be applied to the word line WL6 so that data "0" may be read from the second memory cell connected to the word line WL6 and stored in the third page buffer PB3. Subsequently, a read voltage may be applied to the word line WL7 so that data "1" may be read from the second memory cell connected to the word line WL7 and stored in the third page buffer PB3. Subsequently, a read voltage may be applied to the word line WL8 so that data "0" may be read from the second memory cell connected to the word line WL8 and stored in the third page buffer PB3. As described above, the data "1010" sequentially read from the second memory cells may be decoded into physical address value "3". For example, the control logic 42 may receive the data "1010" from the third page buffer PB3, decode the data "1010" into the physical address value "3", and transmit the physical address value "3" to the storage controller 11.

However, embodiments are not limited to those described above. In some embodiments, a read operation may be performed on the second memory cells of the first to fourth cell strings CS1 to CS4 in units of pages, and the page buffer circuit 102 may store data of the entire page. For example, only the data stored in the third cell string CS3 that has been selected may be decoded into a physical address value, and the physical address value may be transmitted to the storage controller 11.

In an embodiment, the non-volatile memory 100 may include a plurality of memory blocks and apply word lines voltages corresponding to data "0110" to more than one of the memory blocks at the same time, thereby reducing the time taken for searching for cell strings that store the logical address value LAV "1".

Figure 13:
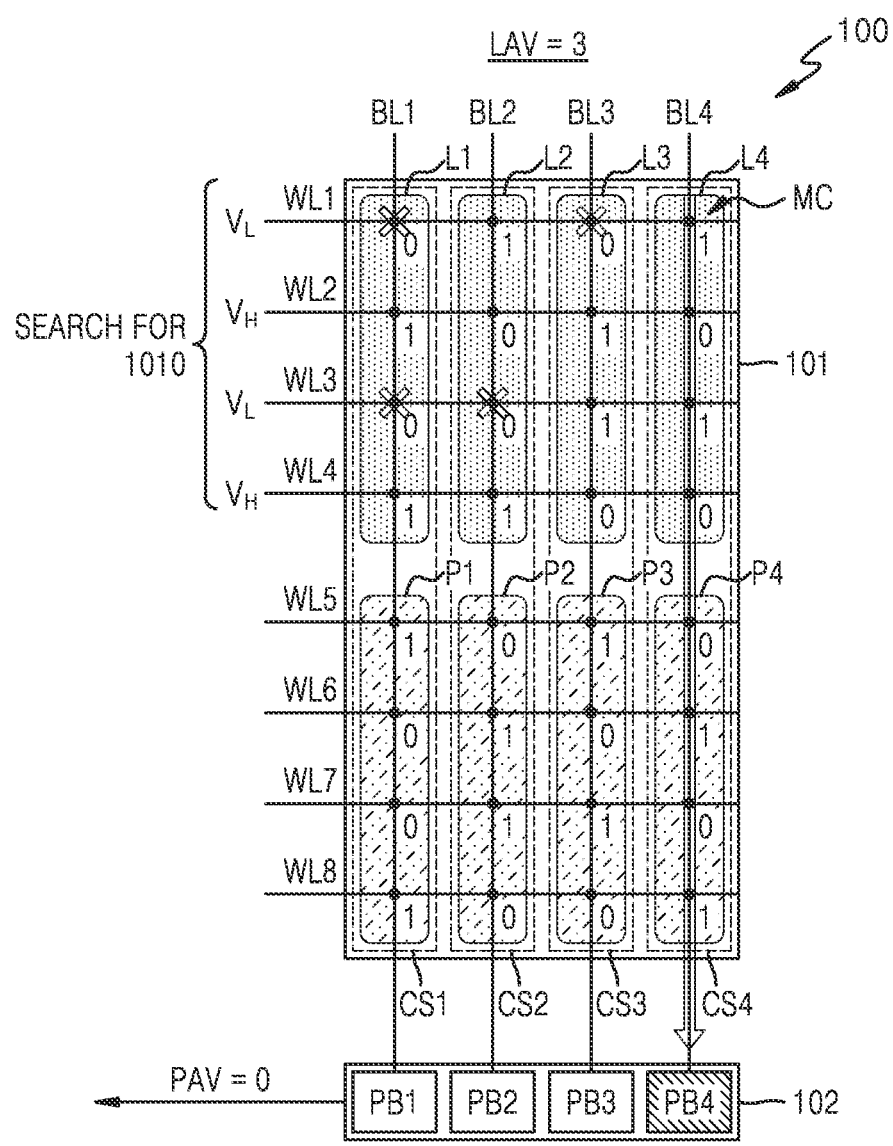
FIG. 13 illustrates a read operation of a non-volatile memory when a logical address value is 3, according to an embodiment.

FIG. 13 illustrates a read operation of the non-volatile memory 100 when the logical address value LAV is 3, according to an embodiment.

Referring to FIGS. 3A and 13, when the logical address value LAV received from the storage controller 11 is 3, the non-volatile memory 100 may encode the logical address value LAV "3" into data "1010". Subsequently, to search for a cell string corresponding to the logical address value LAV "3", word line voltages, i.e., $V_L$, $V_H$, $V_L$, and $V_H$, corresponding to the data "1010" may be respectively applied to the word lines WL1 to WL4 in the first group. For example, first memory cells storing data "0" among first memory cells connected to the word line WL1 and first memory cells connected to the word line WL3 may be turned off. First memory cells storing the fourth logical address value L4 may be turned on, and accordingly, current may flow in the fourth cell string CS4, current may not flow in the first to third strings CS1 to CS3, and the fourth cell string CS4 may be selected as the cell string that stores the logical address value LAV.

Subsequently, a normal read operation may be performed on the second memory cells of the fourth cell string CS4 that has been selected. Read voltages applied to the word lines WL5 to WL8 in the second group may be changed, and data stored in the second memory cells of the selected fourth cell string CS4 may be read. The data read from the second memory cells of the fourth cell string CS4 may correspond to the fourth physical address value P4, e.g., 0, and may be stored in a fourth page buffer PB4. The fourth physical address value P4 stored in the fourth page buffer PB4 may be transmitted to the storage controller 11.

The normal read operation performed on the second memory cells of the fourth cell string CS4 is described in detail below. For example, a read voltage may be applied to the word line WL5 so that data "0" may be read from the second memory cell connected to the word line WL5 and stored in the fourth page buffer PB4. Subsequently, a read voltage may be applied to the word line WL6 so that data "1" may be read from the second memory cell connected to the word line WL6 and stored in the fourth page buffer PB4. Subsequently, a read voltage may be applied to the word line WL7 so that data "0" may be read from the second memory cell connected to the word line WL7 and stored in the fourth page buffer PB4. Subsequently, a read voltage may be applied to the word line WL8 so that data "1" may be read from the second memory cell connected to the word line WL8 and stored in the fourth page buffer PB4. As described above, the data "0101" sequentially read from the second memory cells may be decoded into physical address value "0". For example, the control logic 42 may receive the data "0101" from the fourth page buffer PB4, decode the data "0101" into the physical address value "0", and transmit the physical address value "0" to the storage controller 11.

However, embodiments are not limited to those described above. In some embodiments, a read operation may be performed on the second memory cells of the first to fourth cell strings CS1 to CS4 in units of pages, and the page buffer circuit 102 may store data of the entire page. For example, only the data stored in the fourth cell string CS4 that has been selected may be decoded into a physical address value, and the physical address value may be transmitted to the storage controller 11.

In an embodiment, the non-volatile memory 100 may include a plurality of memory blocks and apply word lines voltages corresponding to data "1010" to more than one of the memory blocks at the same time, thereby reducing the time taken for searching for cell strings that store the logical address value LAV "3".

Figure 14:
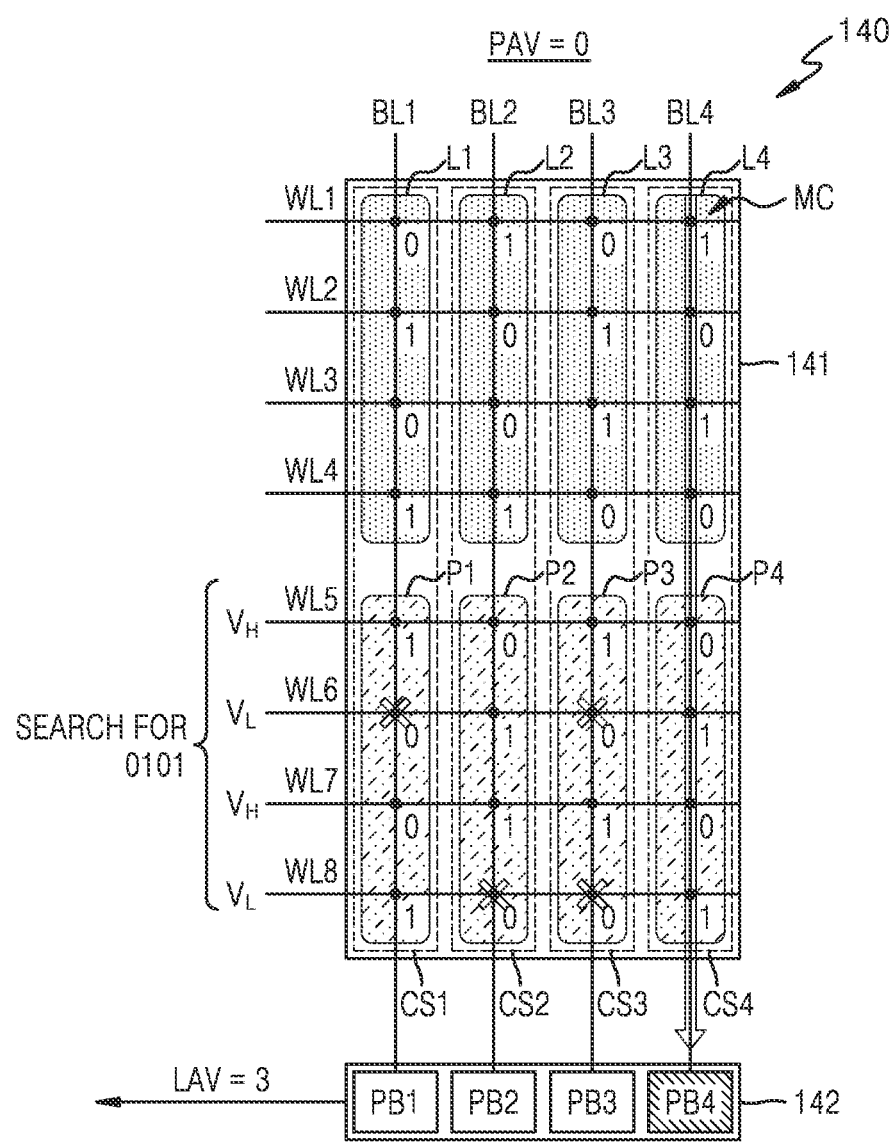
FIG. 14 illustrates a read operation of a non-volatile memory when a physical address value is 0, according to an embodiment.

FIG. 14 illustrates a read operation of a non-volatile memory 140 when the physical address value PAV is 0, according to an embodiment. For example, the non-volatile memory 140 may correspond to an example of the second non-volatile memory 13 in FIG. 1A.

Referring to FIGS. 3A and 14, when the physical address value PAV received from the storage controller 11 is 0, the non-volatile memory 140 may encode the physical address value PAV "0" into data "0101". Subsequently, to search for a cell string corresponding to the physical address value PAV "0", word line voltages, i.e., $V_H$, $V_L$, $V_H$, and $V_L$, corresponding to the data "0101" may be respectively applied to the word lines WL5 to WL8 in the second group. For example, second memory cells storing data "0" among second memory cells connected to the word line WL6 may be turned off, and second memory cells storing data "0" among second memory cells connected to the word line WL8 may be turned off. Second memory cells storing the fourth physical address value P4 corresponding to the physical address value PAV "0" may be turned on, and accordingly, current may flow in the fourth cell string CS4, current may not flow in the first to third strings CS1 to CS3, and the fourth cell string CS4 may be selected as the cell string that stores the physical address value PAV.

Subsequently, a normal read operation may be performed on the first memory cells of the fourth cell string CS4 that has been selected. For example, read voltages applied to the word lines WL1 to WL4 in the first group may be changed, and data stored in the first memory cells of the selected fourth cell string CS4 may be read. The data read from the first memory cells of the fourth cell string CS4 may correspond to the fourth logical address value L4, e.g., 3, and may be stored in the fourth page buffer PB4. The fourth logical address value L4 stored in the fourth page buffer PB4 may be transmitted to the storage controller 11.

The normal read operation performed on the first memory cells of the fourth cell string CS4 is described in detail below. In an embodiment, a read operation may be sequentially performed on the first memory cells respectively connected to the word lines WL1 to WL4 by sequentially applying a read voltage to the word lines WL1 to WL4, and data sequentially read from the first memory cells may be stored in the fourth page buffer PB4. The data stored in the fourth page buffer PB4 may be decoded into a logical address value, and a decoded logical address value may be transmitted to the storage controller 11.

For example, a read voltage may be applied to the word line WL1 so that data "1" may be read from the first memory cell connected to the word line WL1 and stored in the f fourth page buffer PB4. Subsequently, a read voltage may be applied to the word line WL2 so that data "0" may be read from the first memory cell connected to the word line WL2 and stored in the fourth page buffer PB4. Subsequently, a read voltage may be applied to the word line WL3 so that data "1" may be read from the first memory cell connected to the word line WL3 and stored in the fourth page buffer PB4. Subsequently, a read voltage may be applied to the word line WL4 so that data "0" may be read from the first memory cell connected to the word line WL4 and stored in the fourth page buffer PB4. As described above, the data "1001" sequentially read from the second memory cells may be decoded into physical address value "2". For example, the control logic 42 may receive the data "1010" from the fourth page buffer PB4, decode the data "1010" into the logical address value "3", and transmit the logical address value "3" to the storage controller 11.

However, embodiments are not limited to those described above. In some embodiments, a read operation may be performed on the first memory cells of the first to fourth cell strings CS1 to CS4 in units of pages, and a page buffer circuit 142 may store data of the entire page. For example, only the data stored in the fourth cell string CS4 that has been selected may be decoded into a logical address value, and a decoded logical address value may be transmitted to the storage controller 11.

Figure 15:
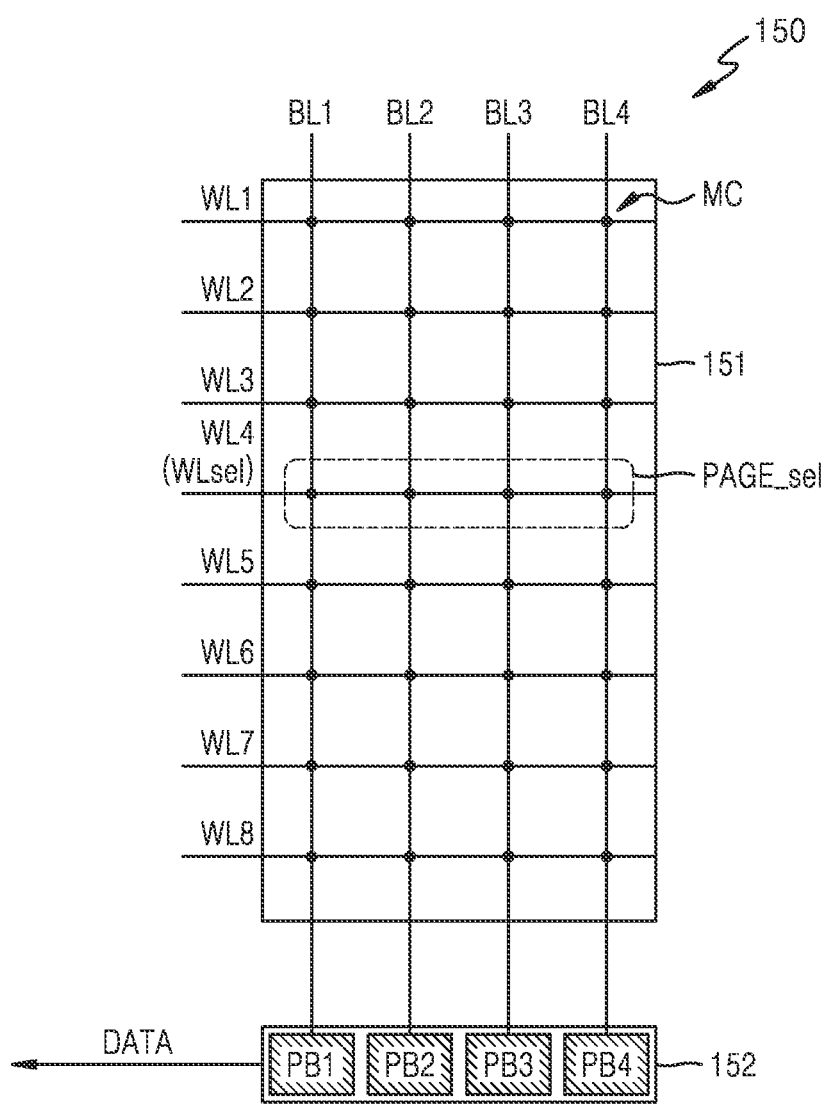
FIG. 15 illustrates a non-volatile memory storing user data, according to an embodiment.

FIG. 15 illustrates a non-volatile memory 150 storing user data, according to an embodiment.

Referring to FIG. 15, the non-volatile memory 150 may include a memory cell array 151, which stores user data and/or metadata, and a page buffer circuit 152. The non-volatile memory 150 may correspond to an example of the second non-volatile memory 13 in FIGS. 1A and 3A. The non-volatile memory 150 may include a plurality of memory cells MC respectively in regions in which the word lines WL1 to WL8 intersect with the bit lines BL1 to BL4.

For example, when each memory cell MC is an SLC, each word line may correspond to a single page. For example, when each memory cell MC is an MLC, each word line may correspond to two pages. For example, when each memory cell MC is a triple-level cell (TLC), each word line may correspond to three pages. For example, when each memory cell MC is a quadruple-level cell (QLC), each word line may correspond to four pages.

Referring to FIGS. 3A and 15, the non-volatile memory 150 may receive the read command CMD_READ including a physical address value PAV from the storage controller 11. For example, the physical address value PAV may correspond to the word line WL4 of the memory cell array 151. In this regard, the word line WL4 may correspond to a selected word line WLsel, and the word lines WL1 to WL3 and WL5 to WL8 may correspond to unselected word lines. In response to the read command CMD_READ, the non-volatile memory 150 may perform a read operation on a selected page PAGE_sel connected to the word line WL4 corresponding to the selected word line WLsel. Data stored in the selected page PAGE_sel may be stored in the first to fourth page buffers PB1 to PB4. The data stored in the first to fourth page buffers PB1 to PB4 may be transmitted to the storage controller 11.

Figure 16:
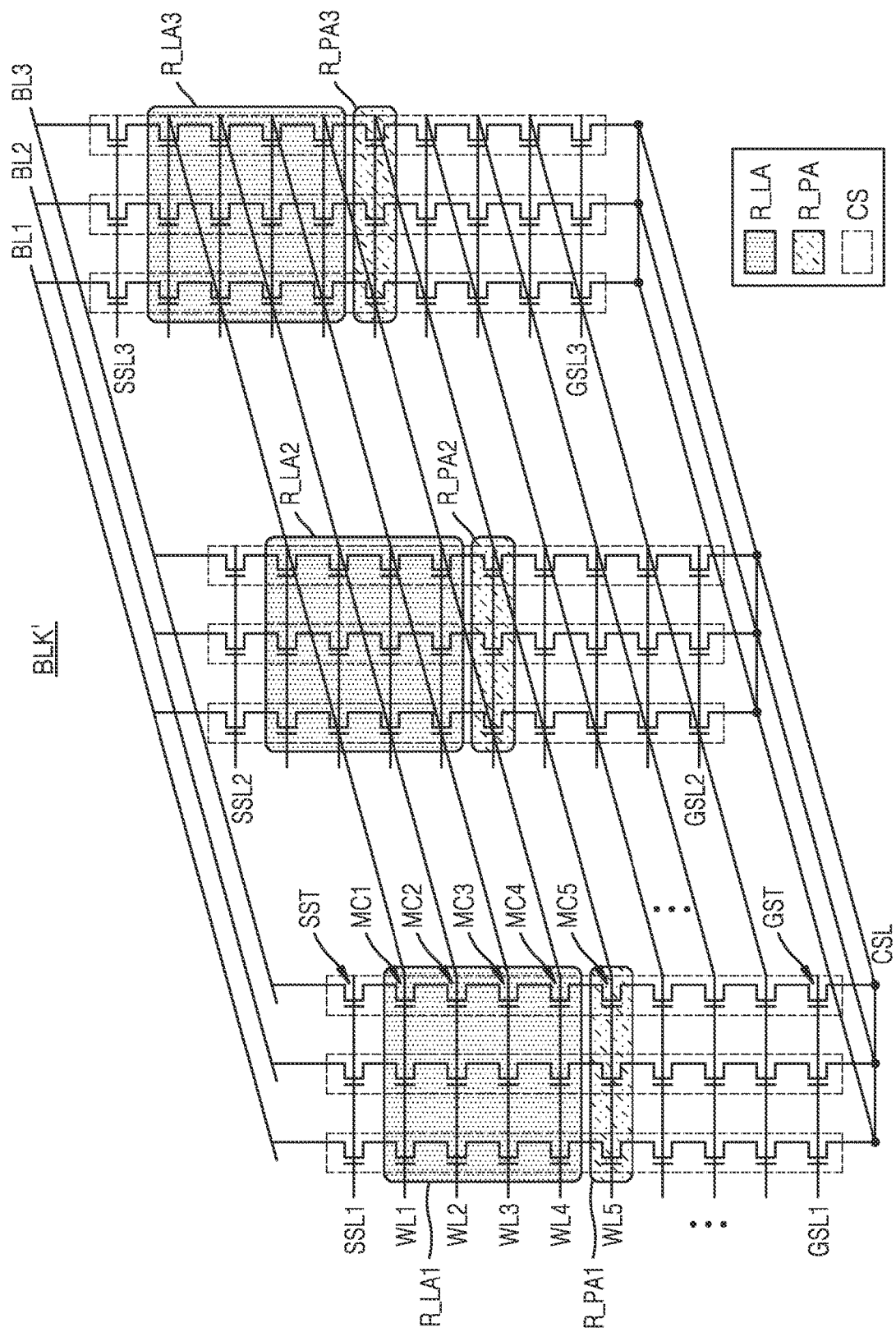
FIG. 16 is a circuit diagram of a memory block according to an embodiment.

FIG. 16 is a circuit diagram of a memory block BLK' according to an embodiment.

Referring to FIG. 16, the memory block BLK' may correspond to a modification of the memory block BLK of FIG. 5, and the descriptions made with reference to FIG. 5 above may also be applied to the memory block BLK'. In an embodiment, the memory block BLK' may include a plurality of logical address value storage regions R_LA1 to R_LA3 and a plurality of physical address value storage regions R_PA1 to R_PA3. For example, the logical address value storage regions R_LA1 to R_LA3 may include SLCs that store encoded data of a logical address value. For example, the physical address value storage regions R_PA1 to R_PA3 may include MLCs, TLCs, or QLCs, which store a physical address value.

For example, the logical address value storage region R_LA1 may include memory cells, which correspond to the first string select line SSL1 and are connected to the word lines WL1 to WL4, and the physical address value storage region R_PA1 may include memory cells, which correspond to the first string select line SSL1 and are connected to the word line WL5. For example, the logical address value storage region R_LA2 may include memory cells, which correspond to the second string select line SSL2 and are connected to the word lines WL1 to WL4, and the physical address value storage region R_PA2 may include memory cells, which correspond to the second string select line SSL2 and are connected to the word line WL5. For example, the logical address value storage region R_LA3 may include memory cells, which correspond to the third string select line SSL3 and are connected to the word lines WL1 to WL4, and the physical address value storage region R_PA3 may include memory cells, which correspond to the third string select line SSL3 and are connected to the word line WL5.

Figure 17:
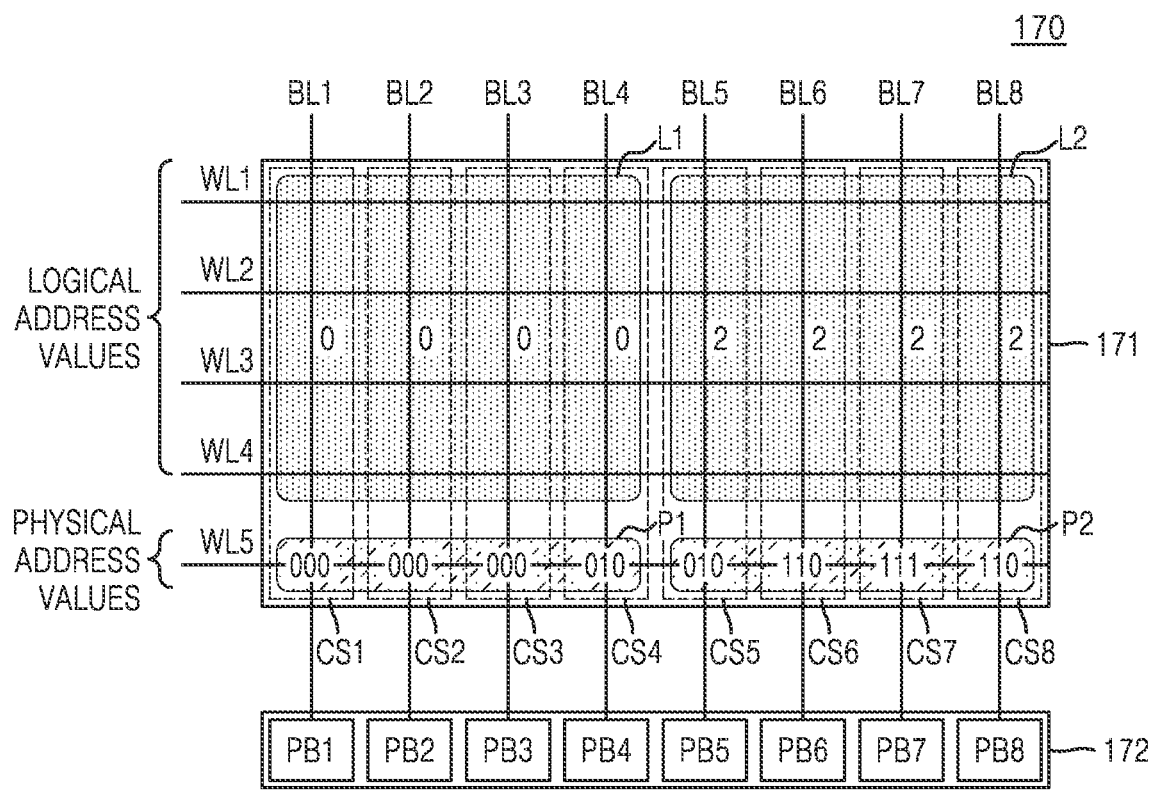
FIG. 17 illustrates a memory cell array, which stores logical address values and physical address values, and a page buffer circuit, according to an embodiment.

FIG. 17 illustrates a memory cell array 171, which stores logical address values and physical address values, and a page buffer circuit 172, according to an embodiment.

Referring to FIG. 17, a non-volatile memory 170 may include the memory cell array 171, which stores logical address values and physical address values, and the page buffer circuit 172. For example, the non-volatile memory 170 may correspond to an example of the first non-volatile memory 12 in FIG. 1A. The memory cell array 171 may include a plurality of cell strings, e.g., first to eighth cell strings CS1 to CS8, which are respectively connected to a plurality of bit lines BL1 to BL8. The page buffer circuit 172 may include a plurality of page buffers, e.g., first to eighth page buffers PB1 to PB8, which are respectively connected to the first to eighth cell strings CS1 to CS8.

Each of the first to eighth cell strings CS1 to CS8 may include first and second memory cells connected in series to each other. The first memory cells may be respectively connected to the word lines WL1 to WL4 in the first group and may store a logical address value. For example, the first memory cells may store encoded data of the logical address value. The second memory cell may be connected to the word line WL5 in the second group and may store a physical address value. For example, the second memory cell may store the physical address value as it is without being encoded. In an embodiment, the first memory cells may include SLCs, which each may store one bit of data. In an embodiment, second memory cells may include MLCs, which each may store at least two bits of data. For example, the second memory cells may include TLCs, but embodiments are not limited thereto.

The first to fourth cell strings CS1 to CS4 may store the first logical address value L1 and the first physical address value P1. The first logical address value L1 may be stored in first memory cells and duplicately stored in memory cells of the first to fourth cell strings CS1 to CS4. For example, the first memory cells of each of the first to fourth cell strings CS1 to CS4 may store encoded data of the first logical address value L1 "0". The first physical address value P1 may be stored in the second memory cells of the first to fourth cell strings CS1 to CS4. For example, the second memory cells of the first to fourth cell strings CS1 to CS4 may store the first physical address value P1 "000000000010".

The fifth to eighth cell strings CS5 to CS8 may store the second logical address value L2 and the second physical address value P2. The second logical address value L2 may be stored in first memory cells and duplicately stored in memory cells of the fifth to eighth cell strings CS5 to CS8. For example, the first memory cells of each of the fifth to eighth cell strings CS5 to CS8 may store encoded data of the second logical address value L2 "2". The second physical address value P2 may be stored in the second memory cells of the fifth to eighth cell strings CS5 to CS8. For example, the second memory cells of the fifth to eighth cell strings CS5 to CS8 may store the second physical address value P2 "010110111110".

Referring to FIGS. 3A and 17, in an embodiment, when a logical address value LAV received from the storage controller 11 is 0, the non-volatile memory 170 may encode the logical address value LAV "0" into data "0101". Subsequently, to search for a cell string corresponding to the logical address value LAV "0", word line voltages, i.e., $V_H$, $V_L$, $V_H$, and $V_L$, corresponding to the data "0101" may be respectively applied to the word lines WL1 to WL4 in the first group, and a pass voltage may be applied to the word line WL5 in the second group. In this case, current may flow in the first to fourth cell strings CS1 to CS4, and the first to fourth cell strings CS1 to CS4 may be selected as cell strings that store the logical address value LAV.

Subsequently, a normal read operation may be performed on the second memory cells of the first to fourth cell strings CS1 to CS4 that have been selected. For example, a read voltage may be applied to the word line WL5 in the second group so that data stored in the second memory cells of the selected first to fourth cell strings CS1 to CS4 may be read. The data read from the second memory cells of the first to fourth cell strings CS1 to CS4 may correspond to the first physical address value P1 and may be stored in the first to fourth page buffers PB1 to PB4. The first physical address value P1 stored in the first to fourth page buffers PB1 to PB4 may be transmitted to the storage controller 11.

Figure 18:
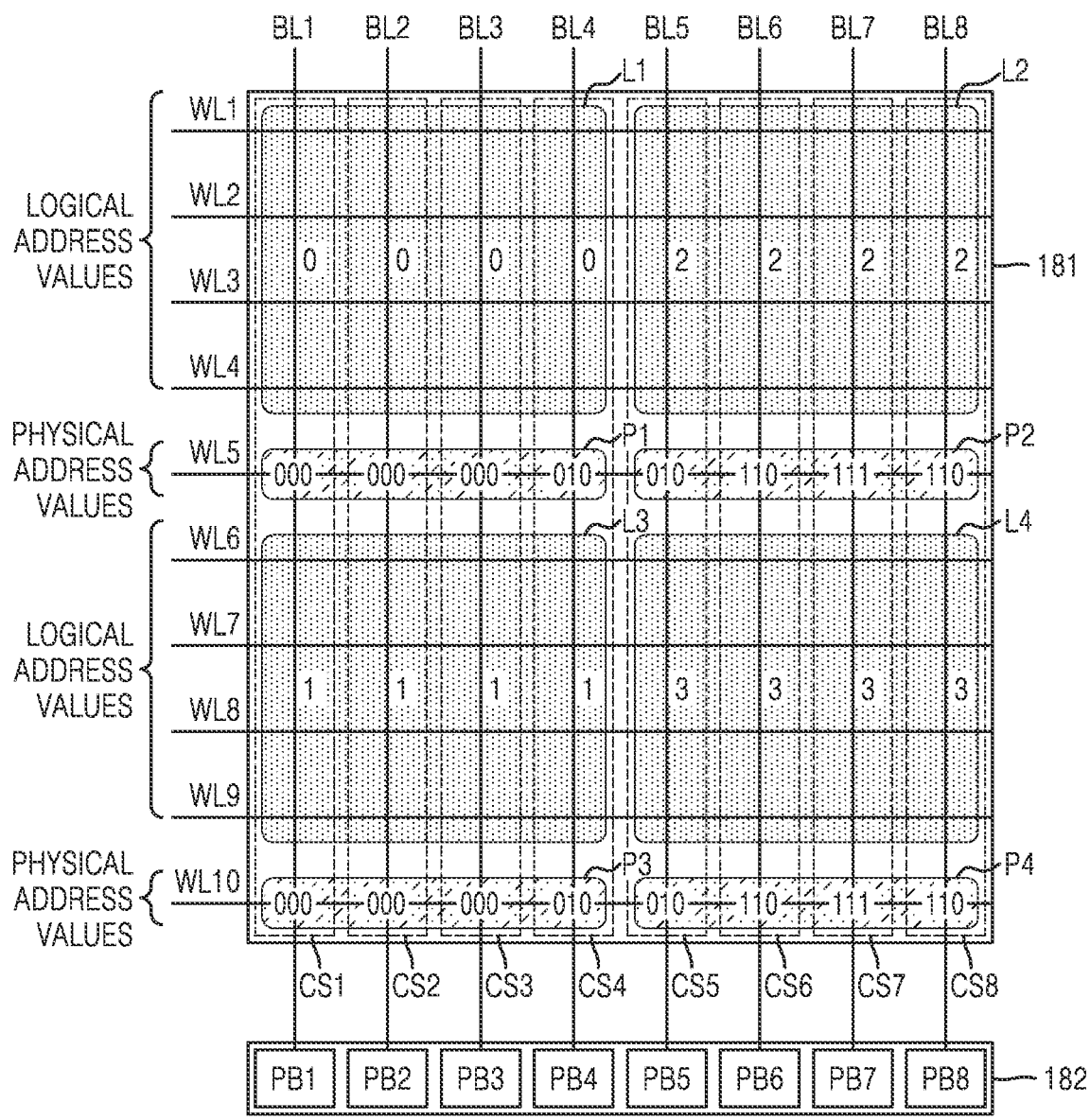
FIG. 18 illustrates a memory cell array, which stores logical address values and physical address values, and a page buffer circuit, according to an embodiment.

FIG. 18 illustrates a memory cell array 181, which stores logical address values and physical address values, and a page buffer circuit 182, according to an embodiment.

Referring to FIG. 18, a non-volatile memory 180 may include the memory cell array 181, which stores logical address values and physical address values, and the page buffer circuit 182. For example, the non-volatile memory 180 may correspond to an example of the first non-volatile memory 12 in FIG. 1A. The memory cell array 181 may include a plurality of cell strings, e.g., the first to eighth cell strings CS1 to CS8, which are respectively connected to the bit lines BL1 to BL8. The page buffer circuit 182 may include a plurality of page buffers, e.g., the first to eighth page buffers PB1 to PB8, which are respectively connected to the first to eighth cell strings CS1 to CS8. The non-volatile memory 180 may correspond to a modification of the non-volatile memory 170 of FIG. 17, and redundant descriptions thereof are omitted below.

Each of the first to eighth cell strings CS1 to CS8 may include first to fourth memory cells connected in series to one another. The first memory cells may be respectively connected to the word lines WL1 to WL4 in the first group and may store a logical address value, and the third memory cells may be respectively connected to word lines WL6 to WL9 in a third group and may store a logical address value. For example, the first memory cells may store encoded data of a logical address value, and the third memory cells may store encoded data of a logical address value. The second memory cell may be connected to the word line WL5 in the second group and may store a physical address value, and the fourth memory cell may be connected to a word line WL10 in a fourth group and may store a physical address value. For example, each of the second and fourth memory cells may store the physical address value as it is without being encoded. In an embodiment, the first and third memory cells may include SLCs, which each may store one bit of data. In an embodiment, the second and fourth memory cells may include MLCs, which each may store at least two bits of data. For example, the second and fourth memory cells may include TLCs, but embodiments are not limited thereto.

The first to fourth cell strings CS1 to CS4 may store the first logical address value L1, the first physical address value P1, the third logical address value L3, and the third physical address value P3. The third logical address value L3 may be stored in the third memory cells and duplicately stored in memory cells of the first to fourth cell strings CS1 to CS4. For example, the third memory cells of each of the first to fourth cell strings CS1 to CS4 may store encoded data of the third logical address value L3 "1". The third physical address value P3 may be stored in the respective fourth memory cells of the first to fourth cell strings CS1 to CS4. For example, the respective fourth memory cells of the first to fourth cell strings CS1 to CS4 may store the third physical address value P3 "000000000010".

The fifth to eighth cell strings CS5 to CS8 may store the second logical address value L2, the second physical address value P2, the fourth logical address value L4, and the fourth physical address value P4. The fourth logical address value L4 may be stored in the third memory cells and duplicately stored in memory cells of the fifth to eighth cell strings CS5 to CS8. For example, the third memory cells of each of the fifth to eighth cell strings CS5 to CS8 may store encoded data of the fourth logical address value L4 "3". The fourth physical address value P4 may be stored in the respective fourth memory cells of the fifth to eighth cell strings CS5 to CS8. For example, the respective fourth memory cells of the fifth to eighth cell strings CS5 to CS8 may store the fourth physical address value P4 "010110111110".

Referring to FIGS. 3A and 18, in an embodiment, when a logical address value LAV received from the storage controller 11 is 1, the non-volatile memory 180 may encode the logical address value LAV "1" into data "0110". Subsequently, to search for a cell string corresponding to the logical address value LAV "1", word line voltages, i.e., $V_H$, $V_L$, $V_L$, and $V_H$, corresponding to the data "0110" may be respectively applied to the word lines WL6 to WL9 in the third group, and a pass voltage may be applied to the word lines WL1 to WL4 in the first group, the word line WL5 in the second group, and the word line WL10 in the fourth group. In this case, current may flow in the first to fourth cell strings CS1 to CS4, and the first to fourth cell strings CS1 to CS4 may be selected as cell strings that store the logical address value LAV.

Subsequently, a normal read operation may be performed on the fourth memory cells of the first to fourth cell strings CS1 to CS4 that have been selected. For example, a read voltage may be applied to the word line WL10 in the fourth group so that data stored in the fourth memory cells of the selected first to fourth cell strings CS1 to CS4 may be read. The data read from the fourth memory cells of the first to fourth cell strings CS1 to CS4 may correspond to the third physical address value P3 and may be stored in the first to fourth page buffers PB1 to PB4. The third physical address value P3 stored in the first to fourth page buffers PB1 to PB4 may be transmitted to the storage controller 11.

Figure 19:
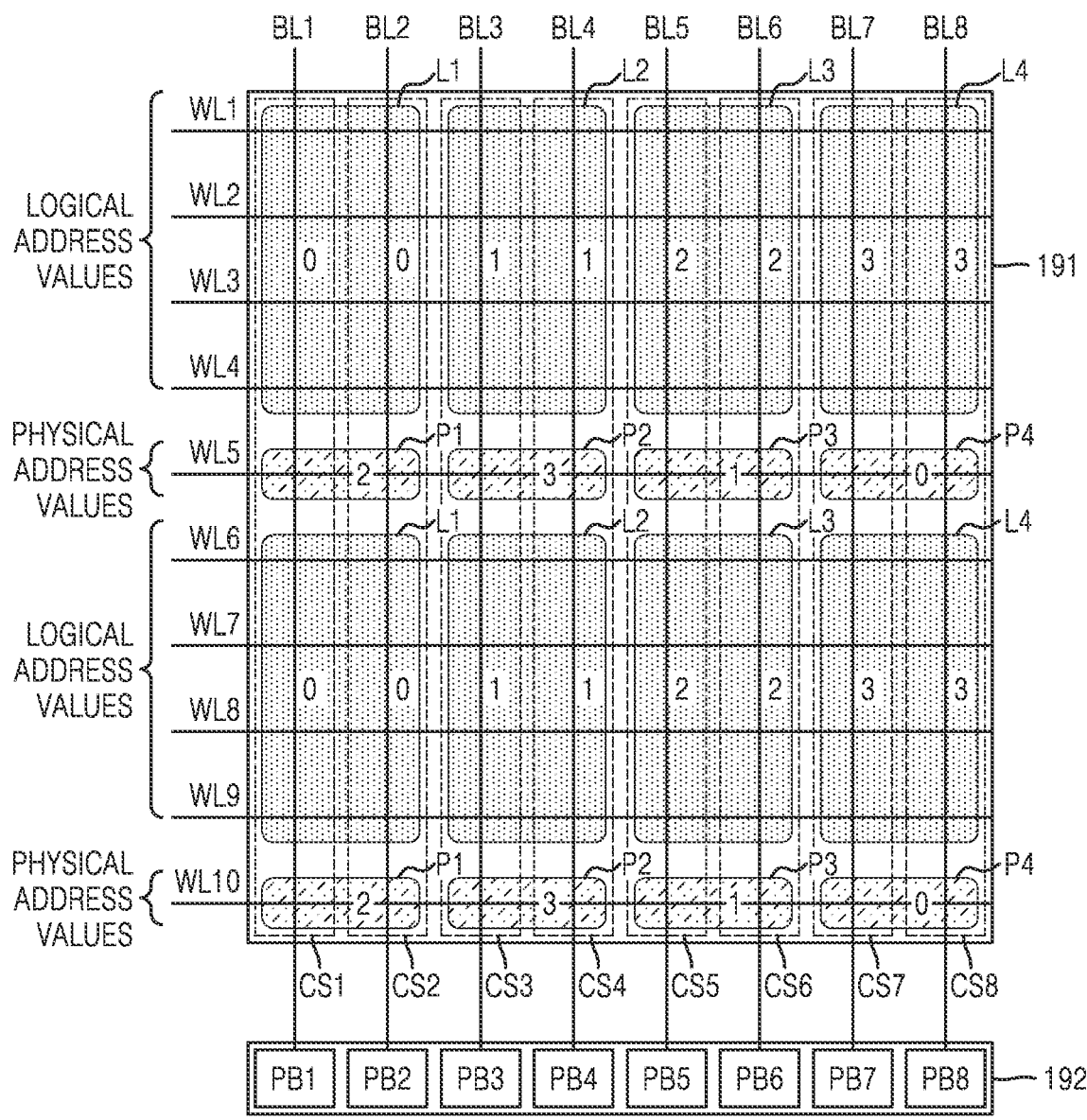
FIG. 19 illustrates a memory cell array, which stores logical address values and physical address values, and a page buffer circuit, according to an embodiment.

FIG. 19 illustrates a memory cell array 191, which stores logical address values and physical address values, and a page buffer circuit 192, according to an embodiment.

Referring to FIG. 19, a non-volatile memory 190 may include the memory cell array 191, which stores logical address values and physical address values, and the page buffer circuit 192. For example, the non-volatile memory 190 may correspond to an example of the first non-volatile memory 12 in FIG. 1A. The memory cell array 191 may include a plurality of cell strings, e.g., the first to eighth cell strings CS1 to CS8, which are respectively connected to the bit lines BL1 to BL8. The page buffer circuit 192 may include a plurality of page buffers, e.g., the first to eighth page buffers PB1 to PB8, which are respectively connected to the first to eighth cell strings CS1 to CS8.

Each of the first to eighth cell strings CS1 to CS8 may include first to fourth memory cells connected in series to one another. The first memory cells may be respectively connected to the word lines WL1 to WL4 in the first group and may store encoded data of a logical address value. The second memory cell may be connected to the word line WL5 in the second group and may store a physical address value. The third memory cells may be respectively connected to the word lines WL6 to WL9 in the third group and may store encoded data of a logical address value. The fourth memory cell may be connected to the word line WL10 in the fourth group and may store a physical address value. In an embodiment, the first and third memory cells may include SLCs, which each may store one bit of data. In an embodiment, the second and fourth memory cells may include MLCs, which each may store at least two bits of data. For example, the second and fourth memory cells may include TLCs, but embodiments are not limited thereto.

The first and second cell strings CS1 and CS2 may store the first logical address value L1 and the first physical address value P1. The first logical address value L1 may be stored in the first and third memory cells and duplicately stored in memory cells of the first and second cell strings CS1 and CS2. For example, the first memory cells of each of the first and second cell strings CS1 and CS2 may store encoded data "0101" of the first logical address value L1 "0", and the third memory cells of each of the first and second cell strings CS1 and CS2 may store the encoded data "0101" of the first logical address value L1 "0". The first physical address value P1 may be stored in the second and fourth memory cells of the first and second cell strings CS1 and CS2. For example, the respective second memory cells of the first and second cell strings CS1 and CS2 may store the first physical address value P1 "2", and the respective fourth memory cells of the first and second cell strings CS1 and CS2 may store the first physical address value P1 "2".

The third and fourth cell strings CS3 and CS4 may store the second logical address value L2 and the second physical address value P2. In detail, the second logical address value L2 may be stored in the first and third memory cells and duplicately stored in memory cells of the third and fourth cell strings CS3 and CS4. For example, the first memory cells of each of the third and fourth cell strings CS3 and CS4 may store encoded data "0110" of the second logical address value L2 "1", and the third memory cells of each of the third and fourth cell strings CS3 and CS4 may store the encoded data "0110" of the second logical address value L2 "1". The second physical address value P2 may be stored in the second and fourth memory cells of the third and fourth cell strings CS3 and CS4. For example, the respective second memory cells of the third and fourth cell strings CS3 and CS4 may store the second physical address value P2 "3", and the respective fourth memory cells of the third and fourth cell strings CS3 and CS4 may store the second physical address value P2 "3".

Memory cells of the fifth and sixth cell strings CS5 and CS6 may store the third logical address value L3 and the third physical address value P3. In detail, the third logical address value L3 may be stored in the first and third memory cells and duplicately stored in memory cells of the fifth and sixth cell strings CS5 and CS6. For example, the first memory cells of each of the fifth and sixth cell strings CS5 and CS6 may store encoded data "1001" of the third logical address value L3 "2", and the third memory cells of each of the fifth and sixth cell strings CS5 and CS6 may store the encoded data "1001" of the third logical address value L3 "2". The third physical address value P3 may be stored in the second and fourth memory cells of the fifth and sixth cell strings CS5 and CS6. For example, the respective second memory cells of the fifth and sixth cell strings CS5 and CS6 may store the third physical address value P3 "1", and the respective fourth memory cells of the fifth and sixth cell strings CS5 and CS6 may store the third physical address value P3 "1".

Memory cells of the seventh and eighth cell strings CS7 and CS8 may store the fourth logical address value L4 and the fourth physical address value P4. In detail, the fourth logical address value L4 may be stored in the first and third memory cells and duplicately stored in memory cells of the seventh and eighth cell strings CS7 and CS8. For example, the first memory cells of each of the seventh and eighth cell strings CS7 and CS8 may store encoded data "1010" of the fourth logical address value L4 "3", and the third memory cells of each of the seventh and eighth cell strings CS7 and CS8 may store the encoded data "1010" of the fourth logical address value L4 "3". The fourth physical address value P4 may be stored in the second and fourth memory cells of the seventh and eighth cell strings CS7 and CS8. For example, the respective second memory cells of the seventh and eighth cell strings CS7 and CS8 may store the fourth physical address value P4 "0", and the respective fourth memory cells of the seventh and eighth cell strings CS7 and CS8 may store the fourth physical address value P4 "0".

Referring to FIGS. 3A and 19, in an embodiment, when a logical address value LAV received from the storage controller 11 is 0, the non-volatile memory 190 may generate data "0101" from the logical address value LAV "0". Subsequently, to search for a cell string corresponding to the logical address value LAV "0", word line voltages, i.e., $V_H$, $V_L$, $V_H$, and $V_L$, corresponding to the data "0101" may be applied to the word lines WL1 to WL4, respectively, in the first group and the word lines WL6 to WL9, respectively, in the third group, and a pass voltage may be applied to the word line WL5 in the second group and the word line WL10 in the fourth group. In this case, current may flow in the first and second cell strings CS1 and CS2, and the first and second cell strings CS1 and CS2 may be selected as cell strings that store the logical address value LAV.

Subsequently, a normal read operation may be performed on the second and fourth memory cells of the first and second cell strings CS1 and CS2 that have been selected. For example, a read voltage may be applied to the word line WL5 in the second group and the word line WL10 in the fourth group so that data stored in the second and fourth memory cells of the selected first and second cell strings CS1 and CS2 may be read. The data read from the second and fourth memory cells of the first and second cell strings CS1 and CS2 may correspond to the first physical address value P1, e.g., 2, and may be stored in the first and second page buffers PB1 and PB2. The first physical address value P1 stored in the first and second page buffers PB1 and PB2 may be transmitted to the storage controller 11.

Figure 20:
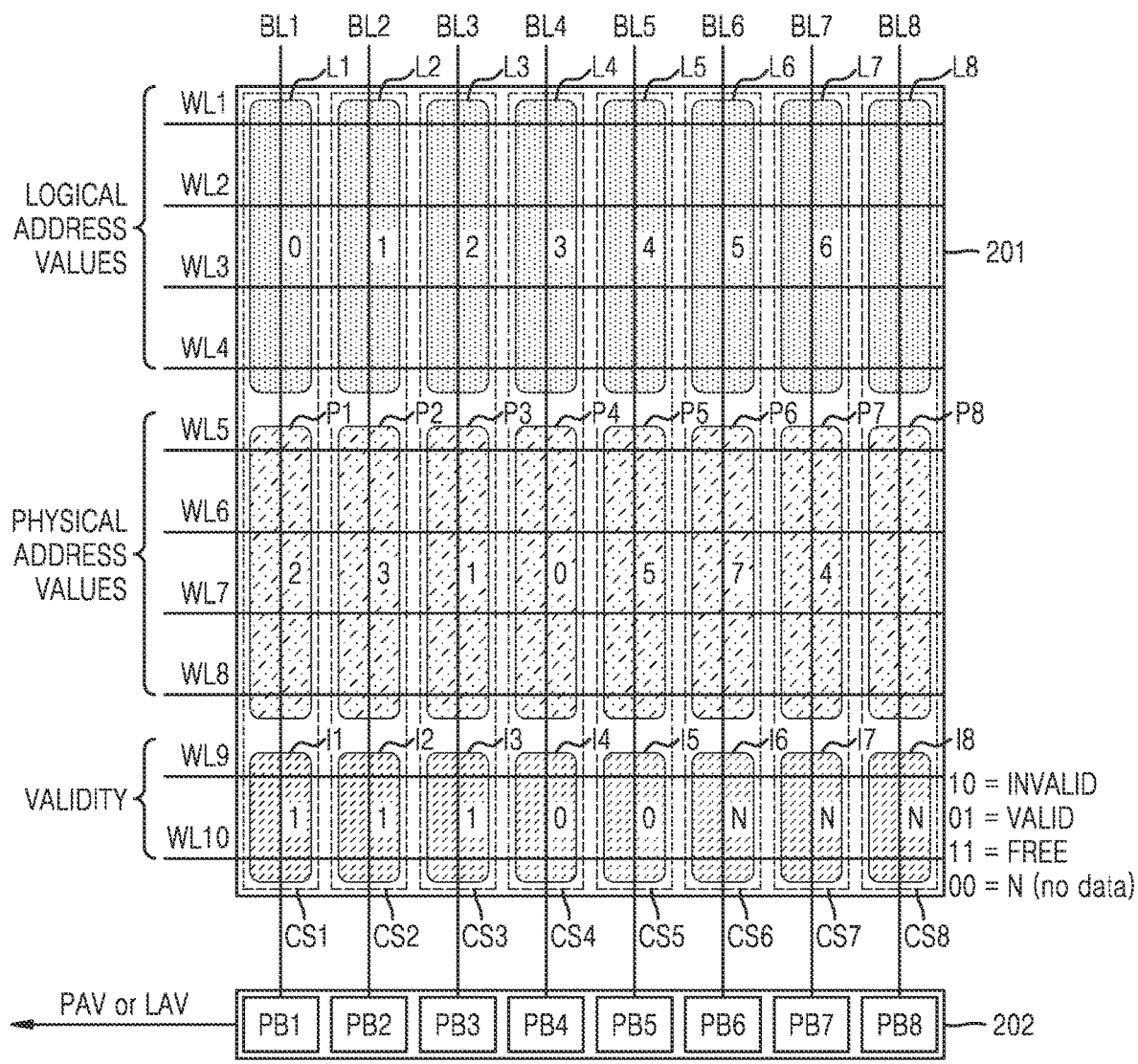
FIG. 20 illustrates a memory cell array, which stores logical address values and physical address values, and a page buffer circuit, according to an embodiment.

FIG. 20 illustrates a memory cell array 201, which stores logical address values and physical address values, and a page buffer circuit 202, according to an embodiment.

Referring to FIG. 20, a non-volatile memory 200 may include the memory cell array 201, which stores logical address values, physical address values, and validity information, and the page buffer circuit 202. For example, the non-volatile memory 200 may correspond to an example of the first non-volatile memory 12 in FIG. 1A. Here, the validity information may indicate the invalidity or validity of the mapping relationship between a logical address and a physical address. For example, when a physical address corresponding to a logical address is changed, the mapping relationship between the logical address and the physical address may be invalid. For example, when a physical address corresponding to a logical address is not changed, the mapping relationship between the logical address and the physical address may be valid.

Each of the first to eighth cell strings CS1 to CS8 may include first to third memory cells connected in series to one another. The first memory cells may be respectively connected to the word lines WL1 to WL4 in the first group and may store encoded data of a logical address value. The second memory cells may be respectively connected to the word lines WL5 to WL8 in the second group and may store encoded data of a physical address value. The third memory cells may be respectively connected to the word lines WL9 and WL10 in the third group and store validity information. For example, when the third memory cells respectively connected to the word lines WL9 and WL10 in the third group are programmed to "10", the validity information may indicate "invalid". For example, when the third memory cells respectively connected to the word lines WL9 and WL10 in the third group are programmed to "01", the validity information may indicate "valid". For example, when the third memory cells respectively connected to the word lines WL9 and WL10 in the third group are programmed to "11", the validity information may indicate "free". For example, when the third memory cells respectively connected to the word lines WL9 and WL10 in the third group are programmed to "00", the validity information may indicate "no data". In an embodiment, the first to third memory cells may include SLCs, which each may store one bit of data. However, embodiments are not limited thereto. At least one of the first to third memory cells may include MLCs, which each may store at least two bits of data.

For example, the second cell string CS2 may include first memory cells storing the second logical address value L2, second memory cells storing the second physical address value P2, and third memory cells storing validity information 12, which indicates whether the mapping relationship between a second logical address and a second physical address is invalid. For example, when the second physical address mapped to the second logical address is changed from 3, which is the second physical address value P2, to another physical address value, the current mapping relationship between the second logical address and the second physical address will be invalid, and the third memory cells may be programmed to "10" indicating the invalidity of the mapping relationship.

For example, the fourth cell string CS4 may include first memory cells storing the fourth logical address value L4, second memory cells storing the fourth physical address value P4, and third memory cells storing validity information 14, which indicates whether the mapping relationship between a fourth logical address and a fourth physical address is invalid. For example, when the fourth physical address mapped to the fourth logical address is maintained as 0, which is the fourth physical address value P4, the current mapping relationship between the fourth logical address and the fourth physical address will be valid, and the third memory cells may be programmed to "01" indicating the validity of the mapping relationship.

Referring to FIGS. 3A and 20, the non-volatile memory 200 may search for a cell string storing a logical address value corresponding to a logical address value LAV received from the storage controller 11 and perform a read operation on the second memory cells of a found cell string, thereby reading a physical address value. For example, when the logical address value LAV is 4, the found cell string may be the fifth cell string CS5. For example, the non-volatile memory 200 may check validity information in the third memory cells of the fifth cell string CS5 and transmit physical information stored in the fifth cell string CS5 to the storage controller 11.

However, embodiments are not limited thereto. In some embodiments, validity information may be represented without using third memory cells. For example, invalidity may be indicated by programming first memory cells, which store encoded data of a logical address value, to "11". For example, invalidity may be indicated by programming a first memory cell, which stores a logical address value, to a program state that is higher than the highest program state.

Figure 21:
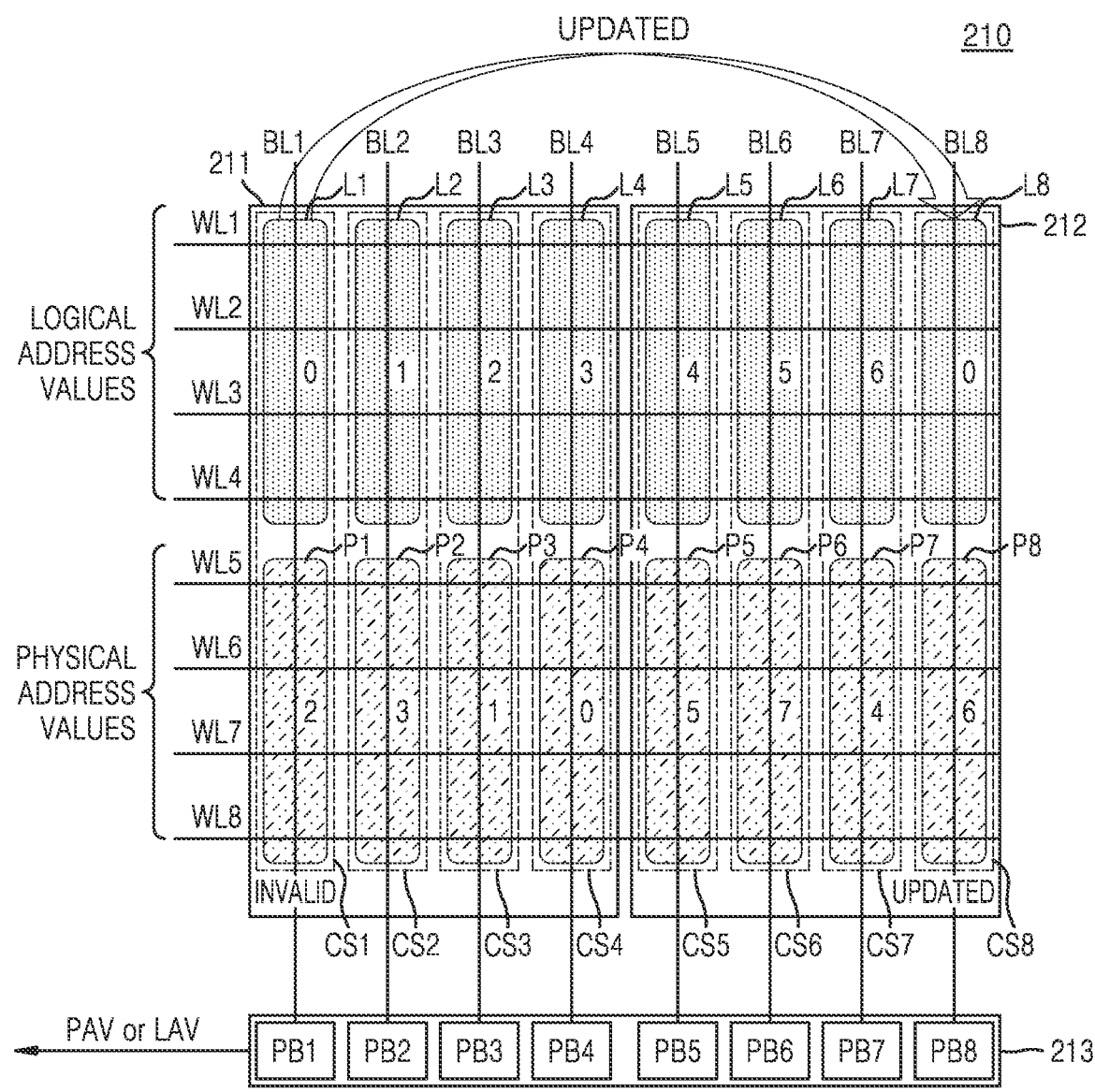
FIG. 21 illustrates a memory cell array, which stores logical address values and physical address values, and a page buffer circuit, according to an embodiment.

FIG. 21 illustrates a memory cell array including memory blocks 211 and 212, which store logical address values and physical address values, and a page buffer circuit 213, according to an embodiment.

Referring to FIG. 21, a non-volatile memory 210 may include the memory block 211, which stores the first to fourth logical address values L1 to L4 and the first to fourth physical address values P1 to P4, and the memory block 212, which stores fifth to eighth logical address values L5 to L8 and fifth to eighth physical address values P5 to P8. For example, updated information in the L2P mapping data D1 in FIG. 2 may be stored in the new memory block 212. However, embodiments are not limited thereto. The updated information in the L2P mapping data D1 may be stored in the old memory block 211. For example, a physical address value mapped to logical address "0" may be updated from 2 to 6. For example, the mapping relationship between logical address "0" and physical address "2" may be changed into the mapping relationship between the logical address "0" and physical address "6", the first cell string CS1 storing the logical address "0" and the physical address "2" may be changed into an invalid string, and the eighth cell string CS8 storing the logical address "0" and the physical address "6" may be updated in the L2P mapping data D1.

Figure 22:
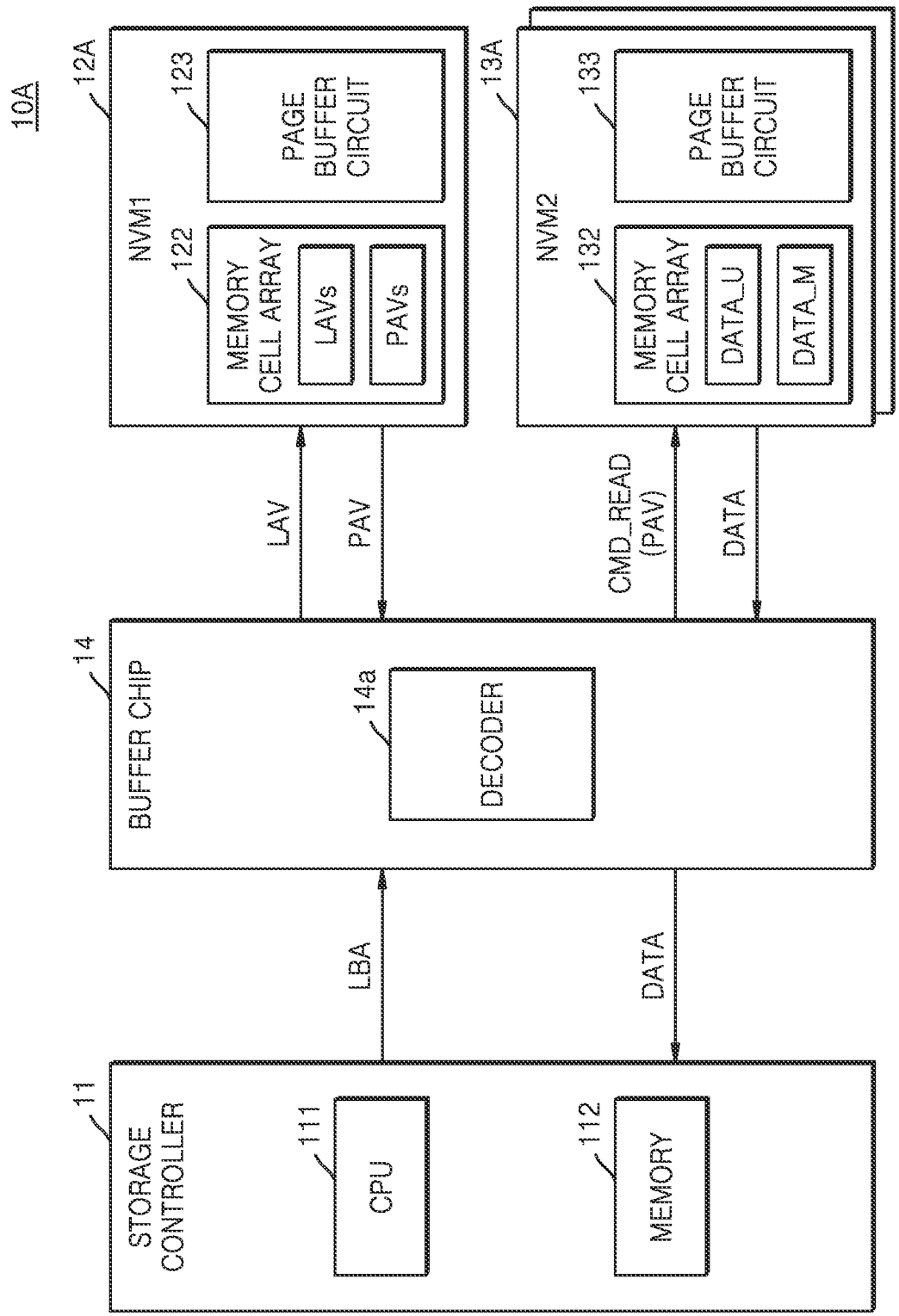
FIG. 22 is a block diagram of a storage device according to an embodiment.

FIG. 22 is a block diagram of a storage device 10A according to an embodiment.

Referring to FIG. 22, the storage device 10A may include the storage controller 11, a buffer chip 14, a first non-volatile memory 12A, and a plurality of second non-volatile memories 13A. The storage device 10A may correspond to a modification of the storage device 10 of FIG. 3A. The descriptions made with reference to FIGS. 2 to 21 above may also be applied to the storage device 10A, and redundant descriptions thereof are omitted below. The storage controller 11 may be substantially similar to the storage controller 11 in FIG. 3A. The first non-volatile memory 12A may include the memory cell array 122 and the page buffer circuit 123, and each of the second non-volatile memories 13A may include the memory cell array 132 and the page buffer circuit 133. According to an embodiment, the first non-volatile memory 12A may be implemented by a plurality of memory chips, memory dies, or memory planes.

The buffer chip 14 may be connected between the storage controller 11 and each of the first and second non-volatile memories 12A and 13A, and may be referred to as a frequency boosting interface (FBI) chip. The buffer chip 14 may be connected to the storage controller 11 through a first channel. The buffer chip 14 may receive a read request and a logical address, e.g., an LBA, from the storage controller 11 through the first channel and transmit data to the storage controller 11 through the first channel. The buffer chip 14 may be connected to the first non-volatile memory 12A through a second channel. The buffer chip 14 may transmit a logical address value LAV to the first non-volatile memory 12A through the second channel and receive a physical address value PAV from the first non-volatile memory 12A through the second channel. The buffer chip 14 may be connected to the second non-volatile memories 13A through a third channel. The buffer chip 14 may transmit the read command CMD_READ including a physical address to the second non-volatile memories 13A through the third channel and receive data from the second non-volatile memories 13A through the third channel.

The buffer chip 14 may include a decoder 14a. The decoder 14a may receive a read request, which includes a logical address, e.g., an LBA, from the storage controller 11. In response to the read request including the LBA, the decoder 14a may select the first non-volatile memory 12A, which stores L2P mapping data, among the first non-volatile memory 12A and the second non-volatile memories 13A. In an embodiment, the decoder 14a may transmit the logical address value LAV, which corresponds to the logical address received from the storage controller 11, to the first non-volatile memory 12A. In an embodiment, the decoder 14a may encode the logical address value LAV corresponding to the logical address received from the storage controller 11, thereby generating data corresponding to the logical address, and may transmit the data to the first non-volatile memory 12A.

The first non-volatile memory 12A may include the memory cell array 122, which stores logical address values LAVs and physical address values PAVs, and the page buffer circuit 123. In an embodiment, the memory cell array 122 may store encoded data corresponding to each of the logical address values LAVs. In an embodiment, the memory cell array 122 may store encoded data corresponding to each of the physical address values PAVs. In an embodiment, the first non-volatile memory 12A may receive the logical address value LAV from the buffer chip 14, generate data by encoding the logical address value LAV, search for a cell string storing the data, and read a physical address value PAV from a found cell string. In an embodiment, the first non-volatile memory 12A may receive data corresponding to the logical address value LAV from the buffer chip 14, search for a cell string storing the data, and read a physical address value PAV from a found cell string.

In response to the physical address value PAV received from the first non-volatile memory 12A, the buffer chip 14 may select one of the second non-volatile memories 13A. Subsequently, the buffer chip 14 may transmit, to the selected second non-volatile memory 13A, the read command CMD_READ including the physical address value PAV. The selected second non-volatile memory 13A may perform a read operation on at least one page corresponding to the physical address value PAV in response to the read command CMD_READ and transmit read data to the buffer chip 14. For example, the read data may include the user data DATA_U and/or the metadata DATA_M. The buffer chip 14 may transmit, to the storage controller 11, the data received from the selected second non-volatile memory 13A.

In an embodiment, the buffer chip 14 and the first and second non-volatile memories 12A and 13A may be implemented in a single package, and may be referred to as a memory device or a non-volatile memory device. For example, the first non-volatile memory 12A and the second non-volatile memories 13A may be implemented in separate memory chips, and the buffer chip 14, the first non-volatile memory 12A, and the second non-volatile memories 13A may be connected to one another by wire bonding in one package. For example, the first non-volatile memory 12A and the second non-volatile memories 13A may be implemented by a stack package having a stack structure.

Figure 23:
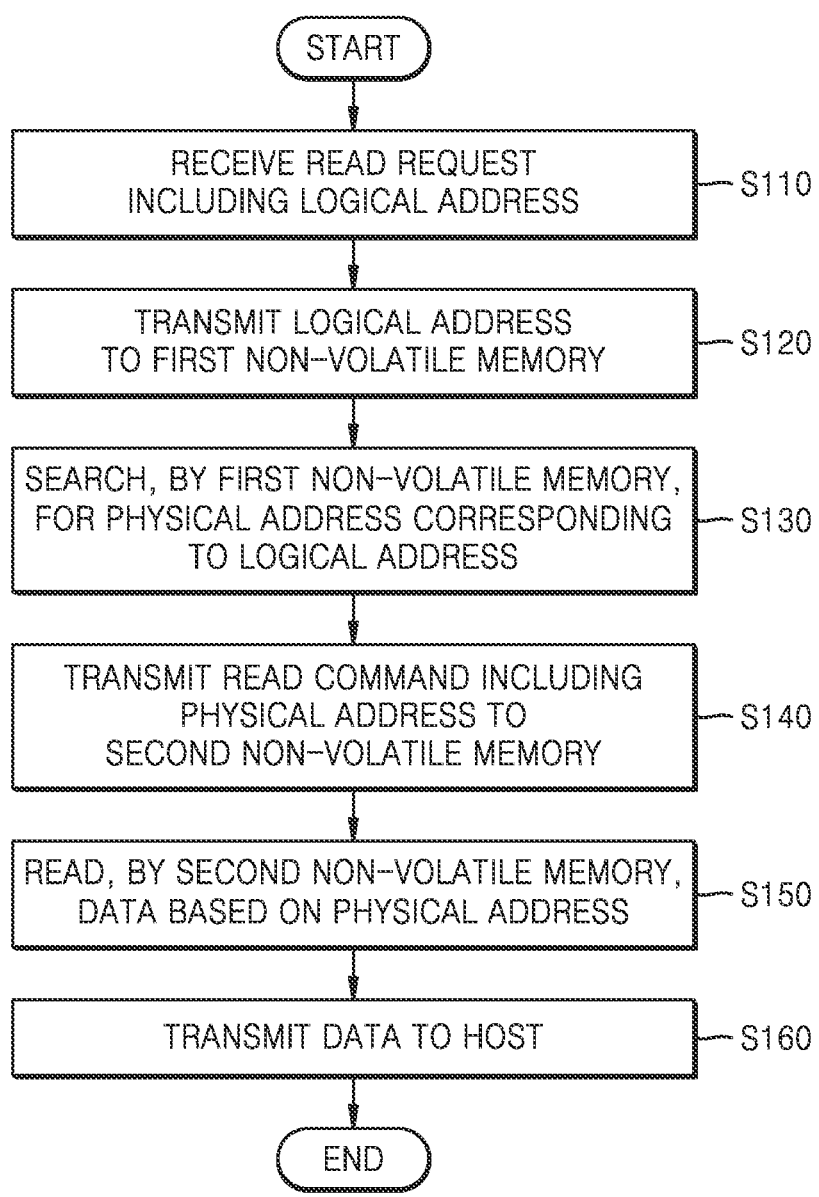
FIG. 23 is a flowchart of an operating method of a storage device, according to an embodiment.

FIG. 23 is a flowchart of an operating method of a storage device, according to an embodiment.

Referring to FIG. 23, the operating method of a storage device may be performed by, for example, the storage device 10 in FIG. 1A and may correspond to a method of performing a read operation in response to a read request from a host. The descriptions made with reference to FIGS. 1A to 22 above may also be applied to the current embodiment, and redundant descriptions thereof are omitted below.

The storage device 10 may receive the read request REQ_READ including a logical address from the host 20 in operation S110. The storage controller 11 may transmit the logical address to the first non-volatile memory 12 in operation S120. The first non-volatile memory 12 may search for a physical address corresponding to the logical address in operation S130. The storage controller 11 may transmit, to the second non-volatile memory 13, a read command including the physical address in operation S140. The second non-volatile memory 13 may read data based on the physical address in operation S150. The storage controller 11 may transmit the data to the host 20 in operation S160.

Figure 24:
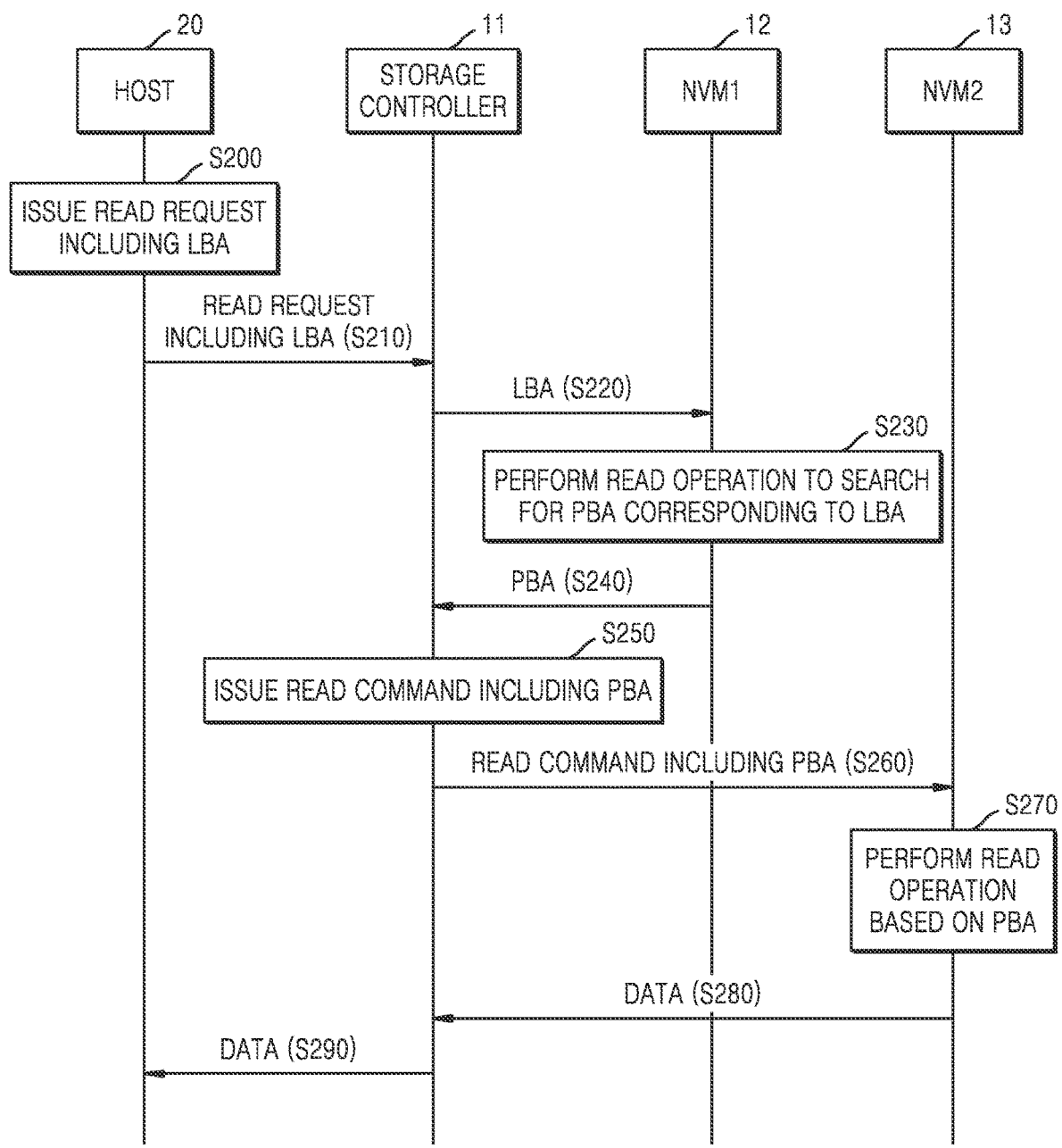
FIG. 24 illustrates operating methods of a host, a storage controller, a first non-volatile memory, and a second non-volatile memory, according to an embodiment.

FIG. 24 illustrates operating methods of a host, a storage controller, a first non-volatile memory, and a second non-volatile memory, according to an embodiment.

Referring to FIG. 24, the host 20 may issue a read request including a logical address, e.g., an LBA, in operation S200. The host 20 may transmit the read request including the LBA to the storage controller 11 in operation S210. The storage controller 11 may transmit the LBA to the first non-volatile memory 12 in operation S220. The first non-volatile memory 12 may perform a read operation to search for a physical address, e.g., a PBA, which corresponds to the LBA, in operation S230. The first non-volatile memory 12 may transmit the PBA to the storage controller 11 in operation S240.

The storage controller 11 may issue a read command including the PBA in operation S250. The storage controller 11 may transmit a read command including the PBA to the second non-volatile memory 13 in operation S260. The second non-volatile memory 13 may perform a read operation based on the PBA in operation S270. The second non-volatile memory 13 may transmit data, which has been read, to the storage controller 11 in operation S280. The storage controller 11 may transmit the data to the host 20 in operation S290.

Figure 25:
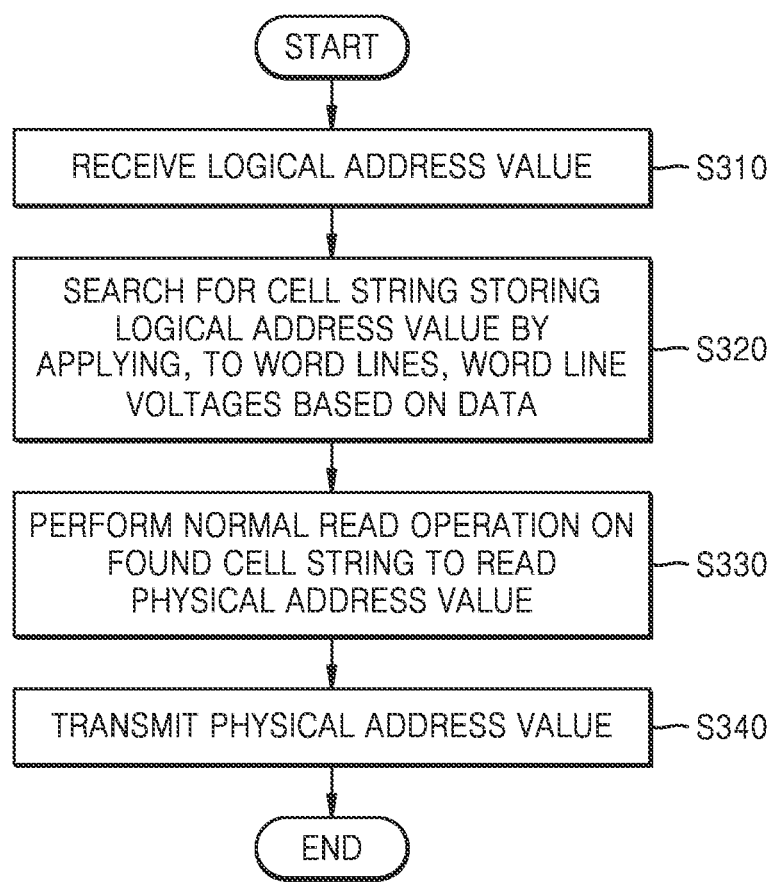
FIG. 25 is a flowchart of an operating method of a non-volatile memory device, according to an embodiment.

FIG. 25 is a flowchart of an operating method of a non-volatile memory device, according to an embodiment.

Referring to FIG. 25, the operating method of a non-volatile memory device may correspond to a method of performing, by the non-volatile memory device, an address search operation on a non-volatile memory, which stores logical address values and physical address values, and may be performed on, for example, the first non-volatile memory 12 in FIGS. 1A and 3A or the first non-volatile memory 12A in FIG. 22. The descriptions made with reference to FIGS. 1A to 22 above may also be applied to the current embodiment, and redundant descriptions thereof are omitted below.

The non-volatile memory device may receive a logical address value in operation S310. For example, the non-volatile memory device may receive the logical address value from a memory controller or a buffer chip. The non-volatile memory device may generate data by encoding the logical address value and searching for a cell string storing the logical address value by applying, to word lines in a first group, word line voltages based on the data in operation S320. The non-volatile memory device may perform a normal read operation on a found cell string to read a physical address value in operation S330. The non-volatile memory device may transmit the physical address value in operation S340. For example, the non-volatile memory device may transmit the physical address value to the memory controller or the buffer chip.

Figure 26:
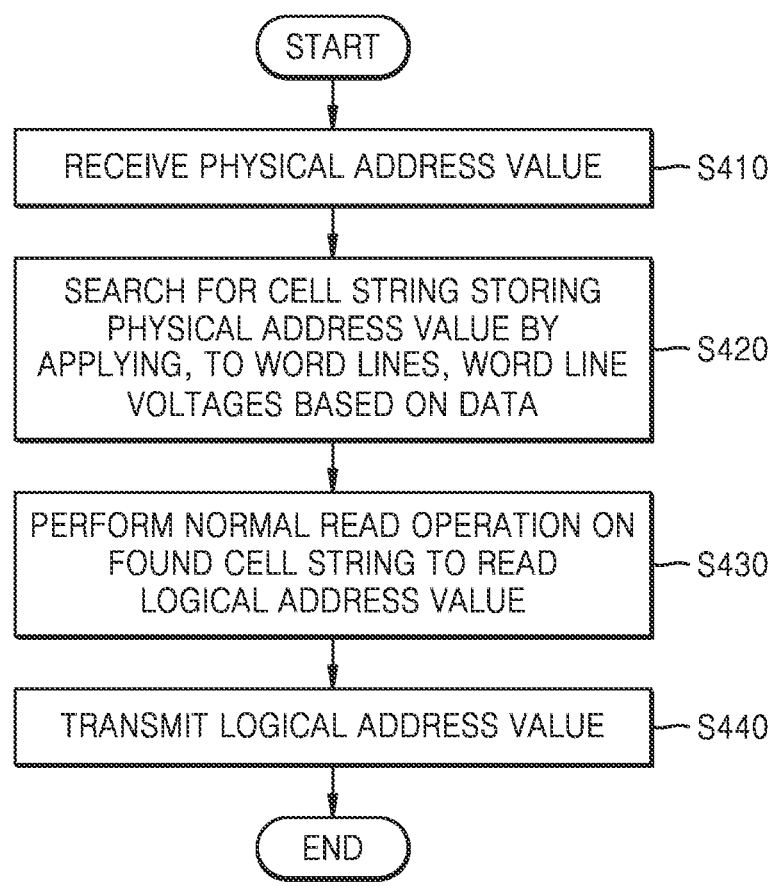
FIG. 26 is a flowchart of an operating method of a non-volatile memory device, according to an embodiment.

FIG. 26 is a flowchart of an operating method of a non-volatile memory device, according to an embodiment.

Referring to FIG. 26, the operating method of a non-volatile memory device may correspond to a method of performing, by the non-volatile memory device, an address search operation on a non-volatile memory, which stores logical address values and physical address values, and may be performed on, for example, the first non-volatile memory 12 in FIGS. 1A and 3A or the first non-volatile memory 12A in FIG. 22. The descriptions made with reference to FIGS. 1A to 22 above may also be applied to the current embodiment, and redundant descriptions thereof are omitted below.

The non-volatile memory device may receive a physical address value in operation S410. For example, the non-volatile memory device may receive the physical address value from a memory controller or a buffer chip. The non-volatile memory device may generate data by encoding the physical address value and searching for a cell string storing the physical address value by applying, to word lines in a first group, word line voltages based on the data in operation S420. The non-volatile memory device may perform a normal read operation on a found cell string to read a logical address value in operation S430. The non-volatile memory device may transmit the logical address value in operation S440. For example, the non-volatile memory device may transmit the logical address value to the memory controller or the buffer chip.

Figure 27:
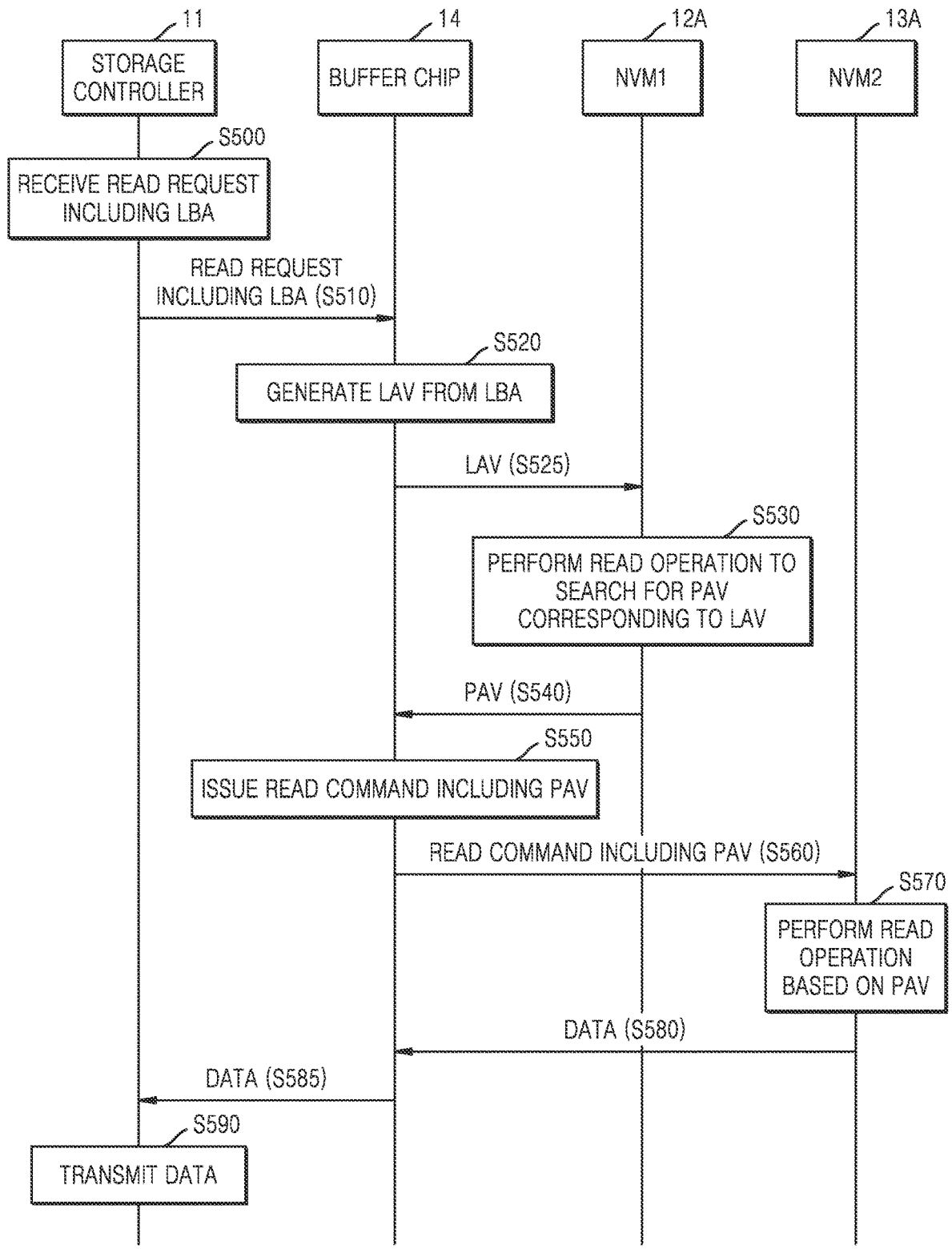
FIG. 27 illustrates operating methods of a storage controller, a buffer chip, a first non-volatile memory, and a second non-volatile memory, according to an embodiment.

FIG. 27 illustrates operating methods of a storage controller, a buffer chip, a first non-volatile memory, and a second non-volatile memory, according to an embodiment.

Referring to FIG. 27, the storage controller 11 may receive a read request including a logical address, e.g., an LBA, in operation S500. The storage controller 11 may transmit the read request including the LBA to the buffer chip 14 in operation S510. The buffer chip 14 may generate a logical address value LAV from the LBA in operation S520. The buffer chip may transmit the logical address value LAV to the first non-volatile memory 12A in operation S525. The first non-volatile memory 12A may perform a read operation to search for a physical address value PAV corresponding to the logical address value LAV in operation S530. The first non-volatile memory 12A may transmit the physical address value PAV to the buffer chip 14 in operation S540.

The buffer chip 14 may issue a read command including the physical address value PAV in operation S550. The buffer chip may transmit, to the second non-volatile memory 13A, the read command including the physical address value PAV in operation S560. The second non-volatile memory 13A may perform a read operation based on the physical address value PAV in operation S570. The second non-volatile memory 13A may transmit data, which has been read, to the buffer chip 14 in operation 580. The buffer chip 14 may transmit the data to the storage controller 11 in operation S585. The storage controller 11 may transmit the data to the host 20 in operation S590.

Figure 28:
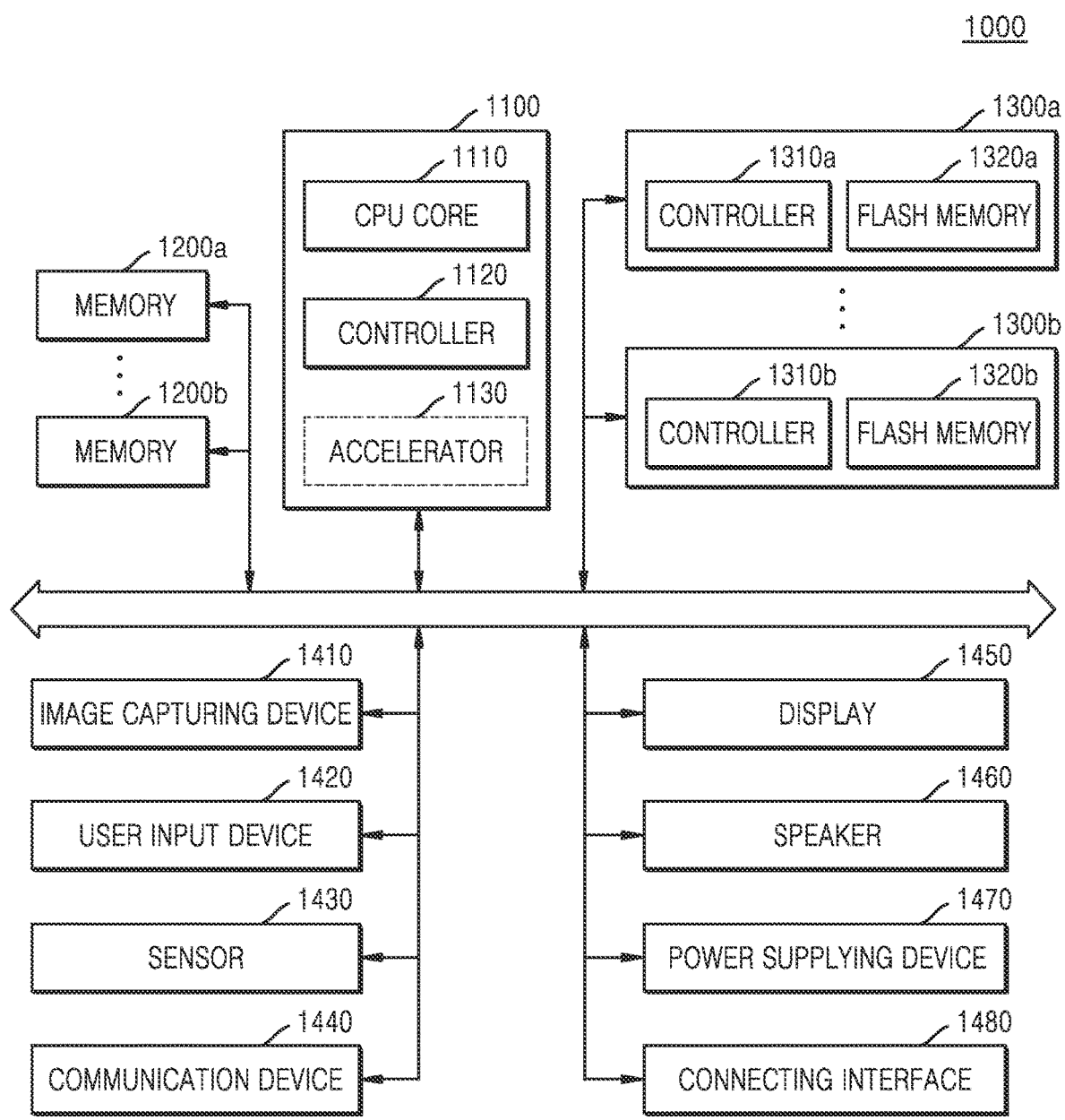
FIG. 28 is a diagram of a system, to which a storage device is applied, according to an embodiment.

FIG. 28 is a diagram of a system 1000 to which a storage device is applied, according to an embodiment. The system 1000 of FIG. 28 may be a mobile system, such as a portable communication terminal (e.g., a mobile phone), a smartphone, a tablet personal computer (PC), a wearable device, a healthcare device, or an Internet of things (IoT) device. However, the system 1000 of FIG. 28 is not necessarily limited to the mobile system and may be a PC, a laptop computer, a server, a media player, or an automotive device (e.g., a navigation device).

Referring to FIG. 28, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as SRAM and/or DRAM, each of the memories 1200a and 1200b may include non-volatile memory, such as a flash memory, PRAM, and/or RRAM. The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and non-volatile memories 1320a and 1320b configured to store data via the control of the storage controllers 1310a and 1310b. Although the non-volatile memories 1320a and 1320b may include flash memories having a 2D structure or a 3D V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a UFS, an eMMC, or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, an MMC interface, an eMMC interface, a UFS interface, an embedded UFS (eUFS) interface, and a compact flash (CF) card interface.

In some embodiments, each of the components represented by a block as illustrated in FIGS. 1A, 1B, 3A, 3B, 4 and 22 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A storage device comprising:
    a first non-volatile memory comprising a plurality of cell strings storing a plurality of logical address values and a plurality of physical address values;
    a second non-volatile memory comprising a plurality of memory cells corresponding to the plurality of physical address values; and
    a storage controller configured to read a first physical address value from the first non-volatile memory based on a first logical address value, and control a read operation on the second non-volatile memory based on the first physical address value,
    wherein a first cell string among the plurality of cell strings comprises:
        a plurality of first memory cells storing the first logical address value and respectively connected to word lines in a first group, and
        at least one second memory cell storing the first physical address value and connected to at least one word line in a second group.

2. The storage device of claim 1, wherein the first non-volatile memory is configured to:
    search for the first cell string storing the first logical address value among the plurality of cell strings by applying, to the word lines in the first group, word line voltages corresponding to the first logical address value, and
    read the first physical address value by performing the read operation on the at least one second memory cell while current flows in the first cell string due to the word line voltages.

3. The storage device of claim 1, wherein the plurality of first memory cells comprise a plurality of first single-level cells storing encoded data of the first logical address value,
    wherein the at least one second memory cell comprises a multi-level cell storing the first physical address value, and
    wherein the multi-level cell is configured to store at least two bits of data.

4. The storage device of claim 1, wherein the plurality of first memory cells comprise a plurality of first single-level cells storing encoded data of the first logical address value, and
    wherein the at least one second memory cell comprises a plurality of second single-level cells storing encoded data of the first physical address value.

5. The storage device of claim 1, wherein a second cell string among the plurality of cell strings comprises:
    a plurality of third memory cells storing the first logical address value and respectively connected to the word lines in the first group; and
    at least one fourth memory cell connected to the at least one word line in the second group, and
    wherein the at least one second memory cell and the at least one fourth memory cell correspond to the first physical address value.

6. The storage device of claim 1, wherein the first non-volatile memory further comprises a row decoder configured to respectively apply, to the word lines in the first group, word line voltages corresponding to the first logical address value.

7. The storage device of claim 1, wherein the first non-volatile memory further comprises a control logic circuit configured to generate data by encoding the first logical address value.

8. The storage device of claim 7, wherein the control logic circuit is further configured to:
    receive the first logical address value in decimal from the storage controller,
    convert the first logical address value into a first value in binary, and
    generate the data by encoding "0" in the first value into "01" and encoding "1" in the first value into "10".

9. The storage device of claim 7, wherein the control logic circuit is further configured to:
    receive the first logical address value in binary from the storage controller, and
    generate the data by encoding "0" in the first logical address value into "01" and encoding "1" in the first logical address value into "10".

10. The storage device of claim 1, wherein the first non-volatile memory further comprises a page buffer configured to buffer the first physical address value read from the at least one second memory cell.

11. The storage device of claim 1, wherein the first cell string further comprises at least one third memory cell storing validity information indicating whether a mapping relationship between the first logical address value and the first physical address value is valid.

12. The storage device of claim 1, wherein, the storage controller is further configured to update a physical address corresponding to the first logical address value to a second physical address value so that a second cell string among the plurality of cell strings comprises:
- a plurality of third memory cells storing the first logical address value; and
- at least one fourth memory cell storing the second physical address value.

13. The storage device of claim 1, further comprising a buffer chip between the storage controller and the first and second non-volatile memories,
- wherein the first non-volatile memory comprises a first memory chip,
- wherein the second non-volatile memory comprises a plurality of second memory chips, and
- wherein the buffer chip is configured to receive the first logical address value from the storage controller, transmit the first logical address value to the first memory chip, receive the first physical address value from the first memory chip and transmit the first physical address value to one of the plurality of second memory chips.

14. A storage device comprising:
- a first non-volatile memory comprising a plurality of cell strings storing a plurality of logical address values and a plurality of physical address values;
- a second non-volatile memory comprising a plurality of memory cells corresponding to the plurality of physical address values; and
- a storage controller configured to read a first logical address value from the first non-volatile memory based on a first physical address value, and control a read operation on the second non-volatile memory based on the first physical address value,
- wherein a first cell string among the plurality of cell strings comprises:
  - a plurality of first memory cells storing the first physical address value and respectively connected to word lines in a first group, and
  - at least one second memory cell storing the first logical address value and connected to at least one word line in a second group.

15. The storage device of claim 14, wherein the plurality of first memory cells comprise a plurality of first single-level cells storing encoded data of the first physical address value,
- wherein the at least one second memory cell comprises a multi-level cell storing the first logical address value, and
- wherein the multi-level cell is configured to store at least two bits of data.

16. The storage device of claim 14, wherein the plurality of first memory cells comprise a plurality of first single-level cells storing encoded data of the first physical address value, and
- wherein the at least one second memory cell comprises a plurality of second single-level cells storing encoded data of the first logical address value.

17. The storage device of claim 14, further comprising a buffer chip between the storage controller and the first and second non-volatile memories,
- wherein the first non-volatile memory comprises a first memory chip,
- wherein the second non-volatile memory comprises a plurality of second memory chips, and
- wherein the buffer chip is configured to receive the first physical address value from the storage controller, transmit the first physical address value to the first memory chip and receive the first logical address value from the first memory chip.

18. A non-volatile memory device comprising:
- a control logic circuit configured to generate data by encoding a first logical address value received from a controller;
- a row decoder configured to respectively apply, to word lines in a first group, word line voltages corresponding to the first logical address value; and
- a memory cell array comprising a plurality of cell strings storing a plurality of logical address values and a plurality of physical address values,
- wherein a first cell string among the plurality of cell strings comprises:
  - a plurality of first memory cells storing the first logical address value and respectively connected to the word lines in the first group, and
  - at least one second memory cell storing a first physical address value mapped to the first logical address value and connected to at least one word line in a second group, and
- wherein the first physical address value is read by a read operation performed on the at least one second memory cell while current flows in the first cell string due to the word line voltages.

19. The non-volatile memory device of claim 18, wherein the plurality of first memory cells comprises a plurality of first single-level cells storing encoded data of the first logical address value,
- wherein the at least one second memory cell comprises a multi-level cell storing the first physical address value, and
- wherein the multi-level cell is configured to store at least two bits of data.

20. The non-volatile memory device of claim 18, wherein the plurality of first memory cells comprise a plurality of first single-level cells storing encoded data of the first logical address value, and
- wherein the at least one second memory cell comprises a plurality of second single-level cells storing encoded data of the first physical address value.

* * * * *